(12) United States Patent
Yamane et al.

(10) Patent No.: US 12,362,610 B2
(45) Date of Patent: Jul. 15, 2025

(54) ROTOR CORE AND METHOD FOR MANUFACTURING ROTOR CORE

(71) Applicant: AISIN CORPORATION, Aichi (JP)

(72) Inventors: Minami Yamane, Kariya (JP); Masahiko Katsuda, Kariya (JP); Yoshie Okumura, Kariya (JP)

(73) Assignee: AISIN CORPORATION, Kariya (JP)

( * ) Notice: Subject to any disclaimer, the term of this patent is extended or adjusted under 35 U.S.C. 154(b) by 233 days.

(21) Appl. No.: 18/031,254

(22) PCT Filed: Nov. 26, 2021

(86) PCT No.: PCT/JP2021/043490
§ 371 (c)(1),
(2) Date: Apr. 11, 2023

(87) PCT Pub. No.: WO2022/114153
PCT Pub. Date: Jun. 2, 2022

(65) Prior Publication Data
US 2023/0387737 A1 Nov. 30, 2023

(30) Foreign Application Priority Data
Nov. 30, 2020 (JP) .................................. 2020-198912

(51) Int. Cl.
*H02K 1/27* (2022.01)
*H02K 1/2706* (2022.01)
*H02K 15/03* (2025.01)
*H02K 15/12* (2006.01)

(52) U.S. Cl.
CPC .......... *H02K 1/2706* (2013.01); *H02K 15/03* (2013.01); *H02K 15/12* (2013.01); *H02K 2213/03* (2013.01)

(58) Field of Classification Search
CPC ...... H02K 1/2706; H02K 15/03; H02K 15/12; H02K 2213/03; H02K 1/2766; H01F 7/021; H01F 41/0266
See application file for complete search history.

(56) References Cited

U.S. PATENT DOCUMENTS

2017/0012510 A1* 1/2017 Hattori .................... H02K 1/27
2020/0412190 A1* 12/2020 Dlala ..................... H01F 1/086

FOREIGN PATENT DOCUMENTS

JP 2016-096665 A 5/2016

* cited by examiner

*Primary Examiner* — Thomas Truong
(74) *Attorney, Agent, or Firm* — Oliff PLC

(57) ABSTRACT

A permanent magnet includes a compression bonded magnet containing a magnetic material and a compression-molding resin material and provided in a magnet hole portion, and an injection bonded magnet containing the magnetic material and an injection-molding resin material and provided so as to adjoin the compression bonded magnet in the magnet hole portion.

10 Claims, 17 Drawing Sheets

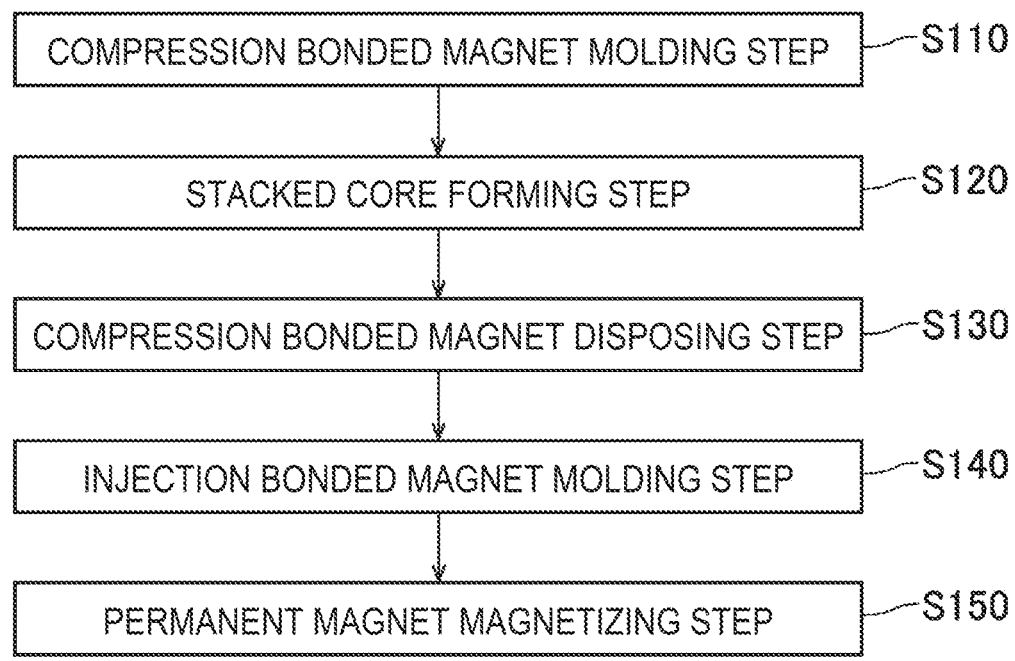

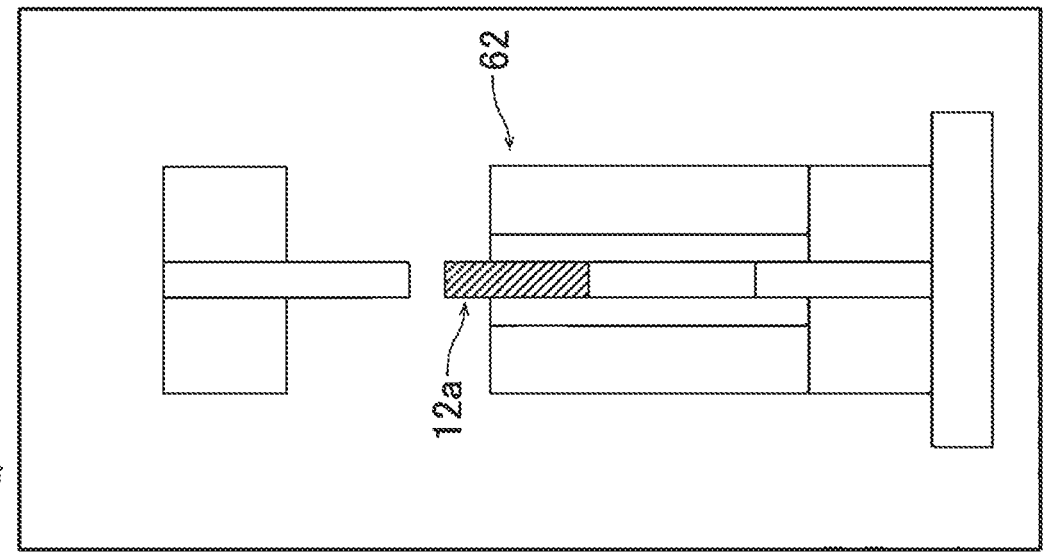
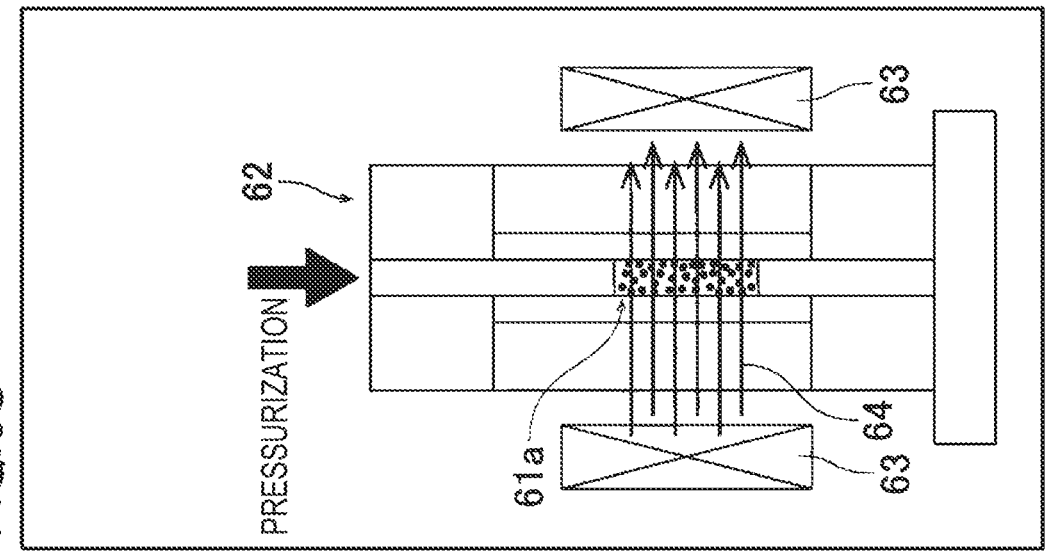

ROTOR CORE AND METHOD FOR MANUFACTURING ROTOR CORE

TECHNICAL FIELD

The present disclosure relates to a rotor core and a method for manufacturing a rotor core.

BACKGROUND ART

Hitherto, there is known a rotor core using bonded magnets as permanent magnets disposed in magnet hole portions. Such a rotor core is disclosed, for example, in Japanese Unexamined Patent Application Publication No. 2016-96665 (JP 2016-96665 A).

JP 2016-96665 A discloses a rotor core in which magnet attachment holes (magnet hole portions) are formed and permanent magnets are embedded and fixed in the magnet attachment holes. In the rotor core described in JP 2016-96665 A, the permanent magnets include a first magnet (bonded magnet) and a second magnet (bonded magnet). The first magnet is formed by injection-molding a first magnet material into the magnet attachment hole. The second magnet is formed by injection-molding a second magnet material into a gap in the magnet attachment hole where the first magnet is not disposed. That is, the second magnet is provided so as to adjoin the first magnet in the magnet attachment hole. The first magnet material and the second magnet material consist of a mixture of magnet powder and resin. The second magnet material has a smaller magnet powder ratio (larger resin ratio) than the first magnet material. Therefore, the second magnet has a lower viscosity than the first magnet. In the rotor core described in JP 2016-96665 A, the first magnet is formed by injection molding in the magnet attachment hole, and then the second magnet is formed by injection molding in the magnet attachment hole.

RELATED ART DOCUMENTS

Patent Documents

Patent Document 1: Japanese Unexamined Patent Application Publication No. 2016-96665 (JP 2016-96665 A)

SUMMARY OF THE DISCLOSURE

Problem to be Solved by the Invention

In the rotor core described in JP 2016-96665 A, both the first magnet and the second magnet constituting the permanent magnet are the bonded magnets obtained by injection molding. Therefore, the degree of freedom in terms of the shape of the permanent magnet is high and workability is good. However, it is necessary to relatively increase the ratio of the resin in the bonded magnet to ensure fluidity during the injection molding of the bonded magnet material. In this case, the magnetic flux density of the permanent magnet decreases because the ratio of the magnet powder in the bonded magnet is relatively small. That is, the motor performance decreases. In the rotor core described in JP 2016-96665 A, the bonded magnet (first magnet) to be formed first in the magnet attachment hole (magnet hole portion) among the bonded magnets constituting the permanent magnet is formed by injection molding. Therefore, the shape and weight of the first magnet may vary in each of the magnet attachment holes. Along with this, the motor performance decreases. Therefore, there is a demand for a rotor core that can be improved in the motor performance when the permanent magnets are formed by the bonded magnets as in the rotor core described in JP 2016-96665 A. To solve the above problems, the bonded magnet to be formed first in the magnet attachment hole (magnet hole portion) may be formed, for example, by baking (sintering) a green compact at a high temperature to obtain a sintered magnet. However, the sintered magnet requires, after the sintering, heat treatment for optimizing the crystal structure, surface treatment for polishing a rough surface, and the like. Thus, there is a problem in that the manufacturing process is complicated.

The present disclosure has been made to solve the above problems, and one object of the present disclosure is to provide a rotor core and a method for manufacturing the rotor core in which the motor performance can be improved while preventing the complication of the manufacturing process when the permanent magnets are formed by the bonded magnets.

Means for Solving the Problem

In order to achieve the above object, a rotor core according to a first aspect of the present disclosure includes an annular stacked core formed by stacking a plurality of electromagnetic steel sheets and having a magnet hole portion, and a permanent magnet disposed in the magnet hole portion. The permanent magnet includes a compression bonded magnet containing a magnetic material and a compression-molding resin material for bonding particles of the magnetic material and provided in the magnet hole portion, and an injection bonded magnet containing the magnetic material and an injection-molding resin material for bonding particles of the magnetic material and provided so as to adjoin the compression bonded magnet in the magnet hole portion.

In the rotor core according to the first aspect of the present disclosure, as described above, the permanent magnet includes the compression bonded magnet containing the magnetic material and the compression-molding resin material and provided in the magnet hole portion, and the injection bonded magnet containing the magnetic material and the injection-molding resin material and provided so as to adjoin the compression bonded magnet in the magnet hole portion. As a result, the compression bonded magnet does not require fluidity and the ratio of the magnetic material can be increased unlike the injection bonded magnet. Thus, the ratio of the magnetic material in the permanent magnet can be increased compared to a case where a first injection bonded magnet and a second injection bonded magnet are provided in the magnet hole portion. When the compression bonded magnet and the injection bonded magnet are provided in the magnet hole portion, the compression bonded magnet is formed by compression molding in the magnet hole portion and then the injection bonded magnet is formed by injection molding so as to adjoin the compression bonded magnet in the gap in the magnet hole portion where the compression bonded magnet is not disposed in consideration of simplification of the manufacturing process. That is, the bonded magnet (compression bonded magnet) to be formed first in the magnet hole portion among the bonded magnets constituting the permanent magnet is formed by compression molding. Therefore, it is possible to reduce variations in the shape and weight of the compression bonded magnet in each magnet hole portion. Unlike sintered magnets, the compression bonded magnet does not require heat treatment for optimizing the crystal structure, surface treatment for polishing a rough surface, and the like. Therefore, the manufacturing process is less complicated. As a result, the motor performance can be improved while preventing the complication of the manufacturing process when the permanent magnets are formed by the bonded magnets.

In order to achieve the above object, a method for manufacturing a rotor core according to a second aspect of the present disclosure is a method for manufacturing a rotor core including an annular stacked core formed by stacking a plurality of electromagnetic steel sheets and having a magnet hole portion, and a permanent magnet disposed in the magnet hole portion. The method includes a compression molding step for forming a compression bonded magnet by compression-molding a material containing a magnetic material and a compression-molding resin material for bonding particles of the magnetic material, a disposing step for disposing the compression bonded magnet in the magnet hole portion of the rotor core after the compression molding step, and an injection molding step for forming, after the disposing step, an injection bonded magnet by injection molding so that a material containing the magnetic material and an injection-molding resin material for bonding particles of the magnetic material is injected into a gap in the magnet hole portion where the compression bonded magnet is not disposed.

In the method for manufacturing the rotor core according to the second aspect of the present disclosure, as described above, the compression bonded magnet is formed by compression molding in the compression molding step, and the injection bonded magnet is formed, in the injection molding step, by injection molding in the gap in the magnet hole portion where the compression bonded magnet is not disposed. As a result, similarly to the rotor core according to the first aspect, the compression bonded magnet does not require fluidity and the ratio of the magnetic material can be increased unlike the injection bonded magnet. Thus, the ratio of the magnetic material in the permanent magnet can be increased compared to a case where the second injection bonded magnet is injection-molded in the gap in the magnet hole portion where the first injection bonded magnet is not disposed. Similarly to the rotor core according to the first aspect, the bonded magnet (compression bonded magnet) to be formed first in the magnet hole portion among the bonded magnets constituting the permanent magnet is formed by compression molding. Therefore, it is possible to reduce variations in the shape and weight of the compression bonded magnet in each magnet hole portion. Similarly to the rotor core according to the first aspect, unlike sintered magnets, the compression bonded magnet does not require heat treatment for optimizing the crystal structure, surface treatment for polishing a rough surface, and the like. Therefore, the manufacturing process is less complicated. As a result, similarly to the rotor core according to the first aspect, the motor performance can be improved while preventing the complication of the manufacturing process when the permanent magnets are formed by the bonded magnets.

Effects of the Invention

According to the present disclosure, as described above, it is possible to provide the rotor core and the method for manufacturing the rotor core in which the motor performance can be improved while preventing the complication of the manufacturing process when the permanent magnets are formed by the bonded magnets.

BRIEF DESCRIPTION OF THE DRAWINGS

FIG. 5 is a flowchart showing a method for manufacturing the rotor core according to the first embodiment.

FIG. 6C is a third diagram illustrating the compression bonded magnet molding step in the method for manufacturing the rotor core according to the first embodiment.

FIG. 6D is a fourth diagram illustrating the compression bonded magnet molding step in the method for manufacturing the rotor core according to the first embodiment.

MODES FOR CARRYING OUT THE DISCLOSURE

Hereinafter, embodiments of the present disclosure will be described with reference to the drawings.

First Embodiment

A configuration of and a method for manufacturing a rotor core 10 according to a first embodiment will be described with reference to FIGS. 1 to 9.
(Configuration of Rotary Electric Machine)

First, the configuration of a rotary electric machine 1 including the rotor core 10 will be described with reference to FIG. 1.

In the following description, an axial direction, a radial direction, and a circumferential direction of the rotor core 10 are defined as "Z direction", "R direction", and "C direction", respectively. One side and the other side in the Z direction are defined as "Z1 side" and "Z2 side", respectively. One side (radially inner side) and the other side (radially outer side) in the R direction are defined as "R1 side" and "R2 side", respectively.

Figure 1:
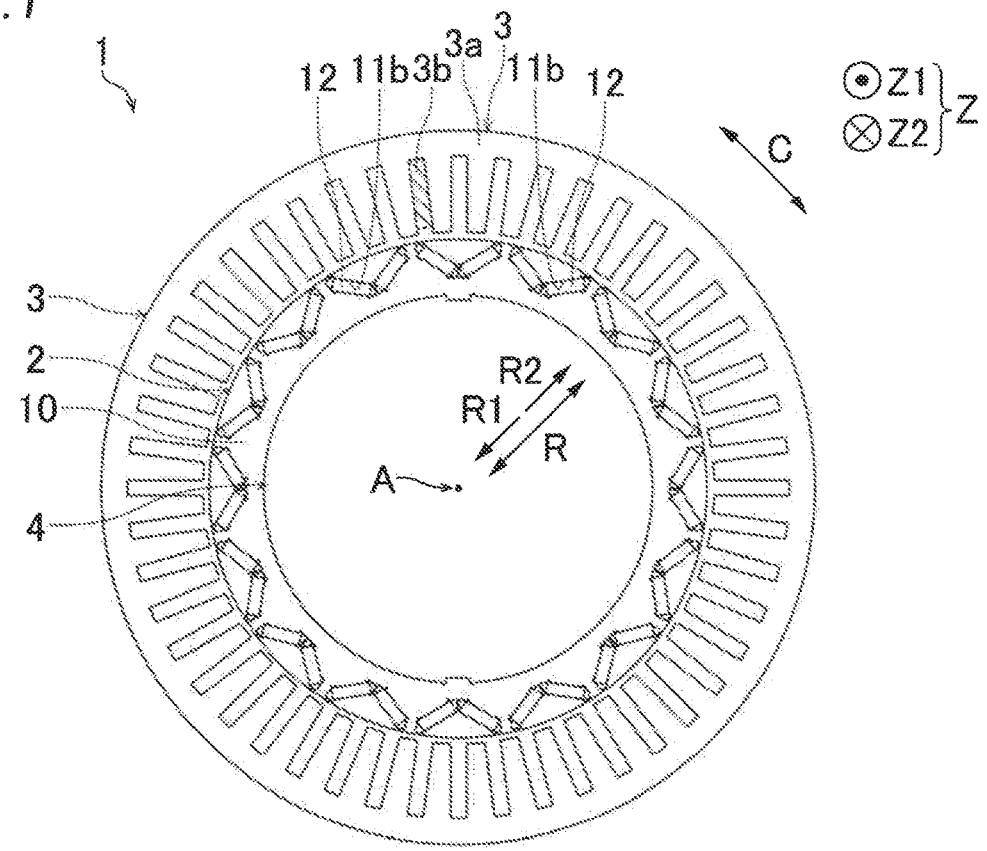
FIG. 1 is a plan view showing the configuration of a rotor core according to a first embodiment.

As shown in FIG. 1, the rotary electric machine 1 includes a rotor 2 and a stator 3. The rotor 2 includes the rotor core 10. For example, the rotary electric machine 1 is a motor, a generator, or a motor generator. The rotor 2 and the stator 3 each have an annular shape. The rotor 2 is disposed on the R1 side of the stator 3 so as to face the stator 3. That is, the rotary electric machine 1 is structured as an inner rotor type rotary electric machine. A shaft 4 is disposed on the R1 side of the rotor 2. The shaft 4 is connected to an engine or an axle via a rotational force transmission member such as a gear.

The stator 3 includes a stator core 3a and a coil 3b disposed in the stator core 3a. The stator core 3a includes, for example, a plurality of electromagnetic steel sheets (silicon steel sheets) stacked on top of each other in the Z direction, and allows a magnetic flux to pass therethrough. The coil 3b is connected to an external power supply unit, and is supplied with electric power (for example, three-phase alternating current power). The coil 3b generates a magnetic field by being supplied with electric power. The rotor 2 and the shaft 4 rotate relative to the stator 3 as the engine or the like is driven even when no electric power is supplied to the coil 3b. Although only a part of the coil 3b is shown in FIG. 1, the coil 3b is disposed over the entire circumference of the stator core 3a.
(Configuration of Rotor Core)

Next, the configuration of the rotor core 10 will be described with reference to FIGS. 1 to 3.

Figure 2:
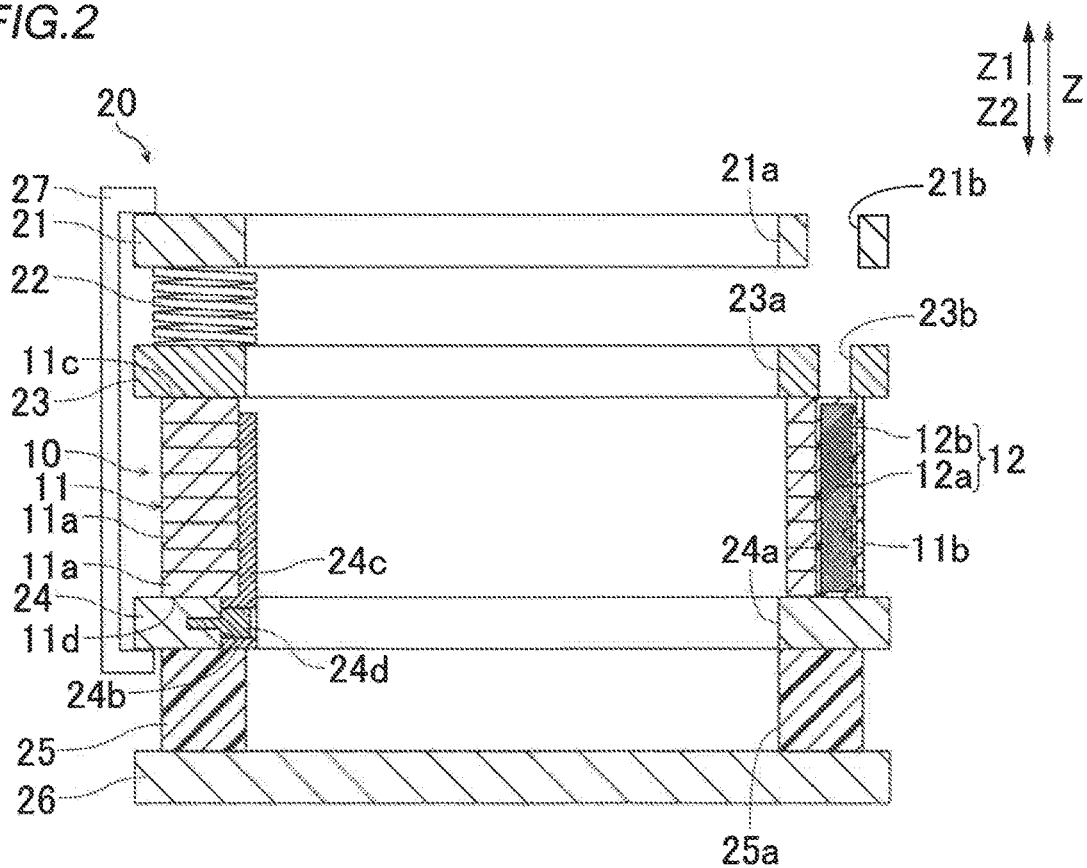
FIG. 2 is a sectional view showing a state in which a stacked core is pressed by a jig according to the first embodiment.

As shown in FIG. 2, the rotor core 10 includes a stacked core 11 obtained by stacking a plurality of electromagnetic steel sheets 11a in a direction (Z direction) along a rotation axis A (see FIG. 1) of the rotor core 10. The stacked core 11 has magnet hole portions 11b extending in the stacking direction (Z direction) of the electromagnetic steel sheets 11a. As shown in FIG. 1, the stacked core 11 has a plurality of (32) magnet hole portions 11b. The magnet hole portions 11b are disposed in a portion of the rotor core 10 on the R2 side. In the rotor core 10, two adjacent magnet hole portions 11b are disposed in a V-shape. FIG. 2 shows the stacked core 11 disposed on a jig 20 described later.

The rotor core 10 includes permanent magnets 12. The permanent magnets 12 are housed (disposed) in the magnet hole portions 11b of the stacked core 11. The permanent magnets 12 are fixed in the magnet hole portions 11b. That is, the rotary electric machine 1 is structured as an interior permanent magnet motor (IPM motor). The permanent magnet 12 has a rectangular cross section orthogonal to the Z direction. For example, the permanent magnets 12 are structured such that their magnetization direction (magnetized direction) is the transverse direction of the permanent magnets 12.

As shown in FIG. 2, in the first embodiment, the permanent magnet 12 includes a compression bonded magnet 12a and an injection bonded magnet 12b. The compression bonded magnet 12a includes a magnetic material and a compression-molding resin material for bonding particles of the magnetic material. The compression bonded magnet 12a is formed by compression-molding a material (hereinafter referred to as "compression-molding material") 61a (see FIG. 6) containing the magnetic material and the compression-molding resin material. The injection bonded magnet 12b includes a magnetic material and an injection-molding resin material for bonding particles of the magnetic material. The injection bonded magnet 12b is formed by injection-molding a material (hereinafter referred to as "injection-molding material") 61b (see FIG. 4) containing the magnetic material and the injection-molding resin material. The injection bonded magnet 12b is provided in a gap in the magnet hole portion 11b where the compression bonded magnet 12a is not disposed. That is, the injection bonded magnet 12b is provided so as to adjoin the compression bonded magnet 12a in the magnet hole portion 11b. As a result, the compression bonded magnet 12a does not require fluidity and the ratio of the magnetic material can be increased unlike the injection bonded magnet 12b. Thus, the ratio of the magnetic material in the permanent magnet 12 can be increased compared to a case where a first injection bonded magnet and a second injection bonded magnet are provided in the magnet hole portion 11b. When the compression bonded magnet 12a and the injection bonded magnet 12b are provided in the magnet hole portion 11b, the compression bonded magnet 12a is formed by compression molding in the magnet hole portion 11b and then the injection bonded magnet 12b is formed by injection molding so as to adjoin the compression bonded magnet 12a in a gap in the magnet hole portion 11b where the compression bonded magnet 12a is not disposed in consideration of simplification of the manufacturing process. That is, the bonded magnet (compression bonded magnet 12a) to be formed first in the magnet hole portion 11b among the bonded magnets constituting the permanent magnet 12 is formed by compression molding. Therefore, it is possible to reduce variations in the shape and weight of the compression bonded magnet 12a in each magnet hole portion 11b. Unlike sintered magnets, the compression bonded magnet 12a does not require heat treatment for optimizing the crystal structure, surface treatment for polishing a rough surface, and the like. Therefore, the manufacturing process is less complicated. As a result, the motor performance can be improved while preventing the complication of the manufacturing process when the permanent magnets 12 are formed by the bonded magnets.

In the first embodiment, the compression bonded magnet 12a is provided on the inner side in the magnet hole portion 11b. That is, the magnet hole portion 11b is provided on the inner side in the magnet hole portion 11b so as to be spaced away from the side walls of the magnet hole portion 11b. The injection bonded magnet 12b is provided so as to surround the compression bonded magnet 12a in the magnet hole portion 11b. Unlike the injection bonded magnet 12b, the compression bonded magnet 12a is likely to rust if it remains exposed due to the gap present in the compression molding. However, the compression bonded magnet 12a can be prevented from rusting because the compression bonded magnet 12a is surrounded by the injection bonded magnet 12b.

Although the ratio of the magnetic material is different between the compression bonded magnet 12a and the injection bonded magnet 12b, the difference in the ratio of the magnetic material does not become significantly large as in a combination of, for example, a sintered magnet and a bonded magnet (provided so as to surround the sintered magnet). Therefore, it is not necessary to design the rotor core 10 in consideration of the magnetic balance, weight balance, and the like of the rotor core 10.

In the first embodiment, the compression bonded magnet 12a has a rectangular shape when viewed in the axial direction (Z direction) of the rotor core 10. Specifically, one compression bonded magnet 12a having a rectangular shape is disposed in each of the two magnet hole portions 11b disposed in the V-shape so as to adjoin each other. Therefore, the compression bonded magnets 12a can be disposed relatively evenly in the circumferential direction compared to a case where the compression bonded magnets 12a have complicated shapes. As a result, it is possible to easily prevent a decrease in the magnetic balance of the rotor core 10 and a decrease in the motor performance.

In the first embodiment, the volume ratio of the magnetic material to the compression-molding resin material in the compression bonded magnet 12a is higher than the volume ratio of the magnetic material to the injection-molding resin material in the injection bonded magnet 12b. Specifically, the ratio of the magnetic material in the compression bonded magnet 12a is 70 vol % or more and 90 vol % or less. The ratio of the magnetic material in the injection bonded magnet 12b is 40 vol % or more and 80 vol % or less. Thus, the ratio of the magnetic material in the permanent magnet 12 can securely be increased compared to a case where all the bonded magnets are injection bonded magnets.

The difference between the volume ratio of the magnetic material to the compression-molding resin material in the compression bonded magnet 12a and the volume ratio of the magnetic material to the injection-molding resin material in the injection bonded magnet 12b is preferably 20% or less. For example, the difference between the volume ratio of the magnetic material to the compression-molding resin material in the compression bonded magnet 12a is preferably 70% or more and 90% or less, and the volume ratio of the magnetic material to the injection-molding resin material in the injection bonded magnet 12b is preferably 50% or more and 80% or less. Thus, it is possible to prevent an excessive increase in a torque ripple and a cogging torque as shown in simulation results below. That is, it is possible to prevent torque instability and the decrease in the motor performance.

The torque ripple is an amount of torque fluctuation (pulsation) when the rotor 2 is rotated by causing a current to flow through the coil 3b of the stator 3, and is caused because an interaction between a magnetic flux generated by the current flowing through the coil 3b and a magnetic flux generated by the permanent magnets 12 of the rotor 2 changes (inconstant) depending on the rotation angle of the rotor 2. The cogging torque is a torque that is felt jerky when the rotor 2 is rotated from the outside in a state in which no current flows through the coil 3b disposed in the stator core 3a of the stator 3, and is caused because, as the rotor 2 rotates, a correlation between the salient poles of the stator 3 and the NS poles of the rotor 2 changes depending on the rotation angle of the rotor 2 and the magnetic attraction force between the stator 3 and the rotor 2 changes.

<Simulation Results>

Figure 3A:
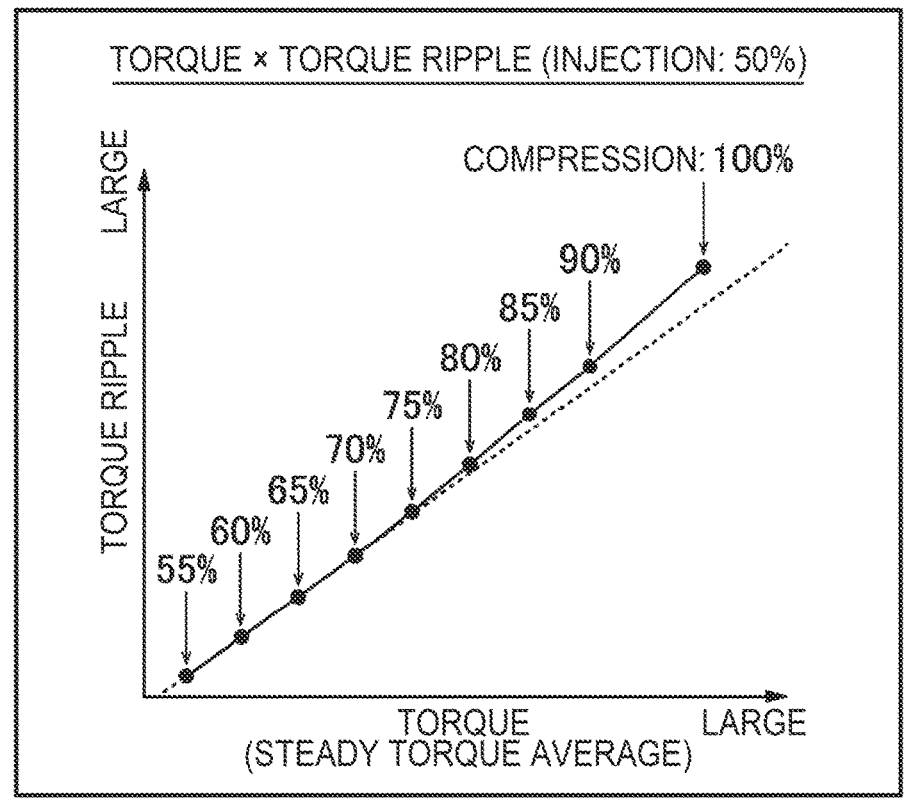
FIG. 3A is a first diagram showing a result of simulation of a torque ripple when the ratio of a magnetic material in a compression bonded magnet of the rotor core is changed according to the first embodiment.
Figure 3B:
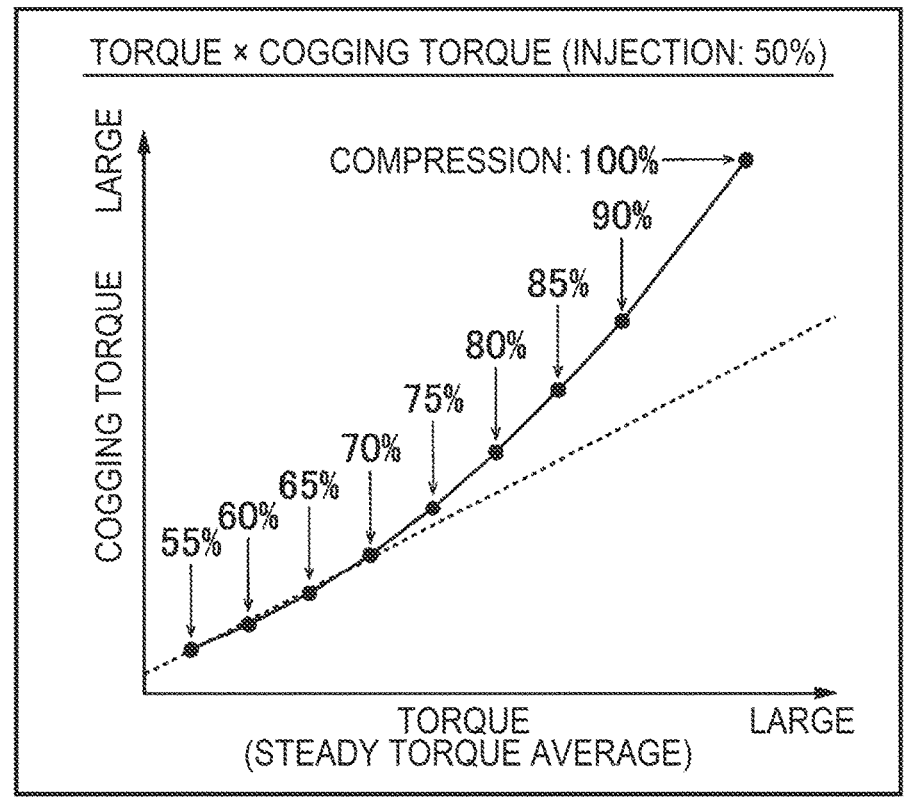
FIG. 3B is a first diagram showing a result of simulation of a cogging torque when the ratio of the magnetic material in the compression bonded magnet of the rotor core is changed according to the first embodiment.

As shown in FIG. 3A, when the ratio of the magnetic material in the injection bonded magnet 12b is 50% and the ratio of the magnetic material in the compression bonded magnet 12a changes, the magnitude of the torque ripple is distributed along a proportional line (dashed line in the figure) approximately in proportion to the magnitude of the torque when the ratio of the magnetic material in the compression bonded magnet 12a is 70% or less. When the ratio of the magnetic material in the compression bonded magnet 12a is more than 70%, the magnitude of the torque ripple is distributed so as to gradually deviate from the proportional line as the ratio of the magnetic material in the compression bonded magnet 12a increases. This means that, when the ratio of the magnetic material in the injection bonded magnet 12b is 50% and the ratio of the magnetic material in the compression bonded magnet 12a is more than 70%, the magnitude of the torque ripple excessively increases relative to the magnitude of the torque. As shown in FIG. 3B, when the ratio of the magnetic material in the injection bonded magnet 12b is 50% and the ratio of the magnetic material in the compression bonded magnet 12a changes, the magnitude of the cogging torque is distributed along a proportional line (dashed line in the figure) approximately in proportion to the magnitude of the torque when the ratio of the magnetic material in the compression bonded magnet 12a is 70% or less. When the ratio of the magnetic material in the compression bonded magnet 12a is more than 70%, the magnitude of the cogging torque is distributed so as to gradually deviate from the proportional line as the ratio of the magnetic material in the compression bonded magnet 12a increases. This means that, when the ratio of the magnetic material in the injection bonded magnet 12b is 50% and the ratio of the magnetic material in the compression bonded magnet 12a is more than 70%, the magnitude of the cogging torque excessively increases relative to the magnitude of the torque. Therefore, when the ratio of the magnetic material in the injection bonded magnet 12b is 50%, the excessive increase in the torque ripple and the cogging torque can be prevented by setting the ratio of the magnetic material in the compression bonded magnet 12a to 70% or less. The torque in FIG. 3 means an average value of a steady torque.

Figure 3C:
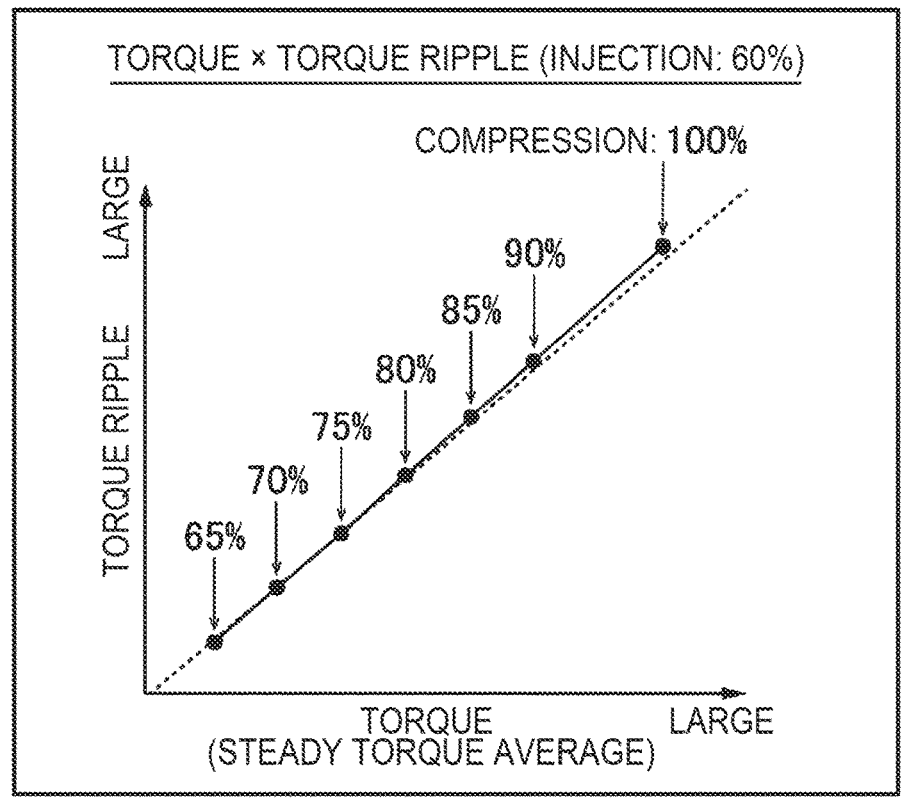
FIG. 3C is a second diagram showing a result of simulation of the torque ripple when the ratio of the magnetic material in the compression bonded magnet of the rotor core is changed according to the first embodiment.
Figure 3D:
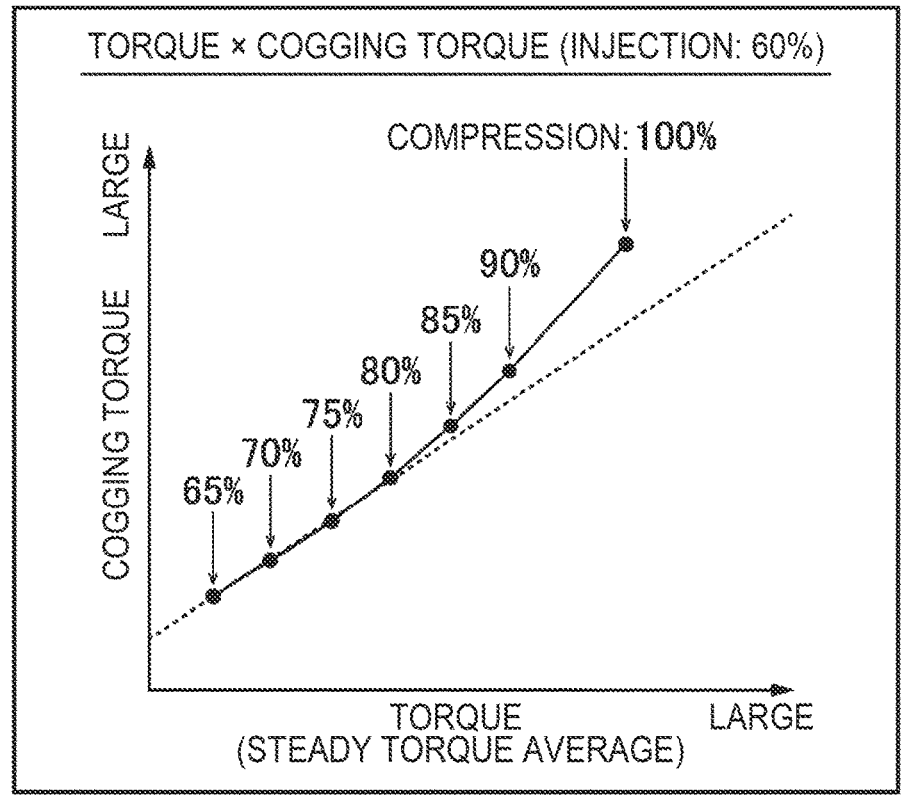
FIG. 3D is a second diagram showing a result of simulation of the cogging torque when the ratio of the magnetic material in the compression bonded magnet of the rotor core is changed according to the first embodiment.

As shown in FIG. 3C, when the ratio of the magnetic material in the injection bonded magnet 12b is 60% and the ratio of the magnetic material in the compression bonded magnet 12a changes, the magnitude of the torque ripple is distributed along a proportional line (dashed line in the figure) approximately in proportion to the magnitude of the torque when the ratio of the magnetic material in the compression bonded magnet 12a is 80% or less. When the ratio of the magnetic material in the compression bonded magnet 12a is more than 80%, the magnitude of the torque ripple is distributed so as to gradually deviate from the proportional line as the ratio of the magnetic material in the compression bonded magnet 12a increases. This means that, when the ratio of the magnetic material in the injection bonded magnet 12b is 60% and the ratio of the magnetic material in the compression bonded magnet 12a is more than 80%, the magnitude of the torque ripple excessively increases relative to the magnitude of the torque. As shown in FIG. 3D, when the ratio of the magnetic material in the injection bonded magnet 12b is 60% and the ratio of the magnetic material in the compression bonded magnet 12a changes, the magnitude of the cogging torque is distributed along a proportional line (dashed line in the figure) approximately in proportion to the magnitude of the torque when the ratio of the magnetic material in the compression bonded magnet 12a is 80% or less. When the ratio of the magnetic material in the compression bonded magnet 12a is more than 80%, the magnitude of the cogging torque is distributed so as to gradually deviate from the proportional line as the ratio of the magnetic material in the compression bonded magnet 12a increases. This means that, when the ratio of the magnetic material in the injection bonded magnet 12b is 60% and the ratio of the magnetic material in the compression bonded magnet 12a is more than 80%, the magnitude of the cogging torque excessively increases relative to the magnitude of the torque. Therefore, when the ratio of the magnetic material in the injection bonded magnet 12b is 60%, the excessive increase in the torque ripple and the cogging torque can be prevented by setting the ratio of the magnetic material in the compression bonded magnet 12a to 80% or less.

Figure 3E:
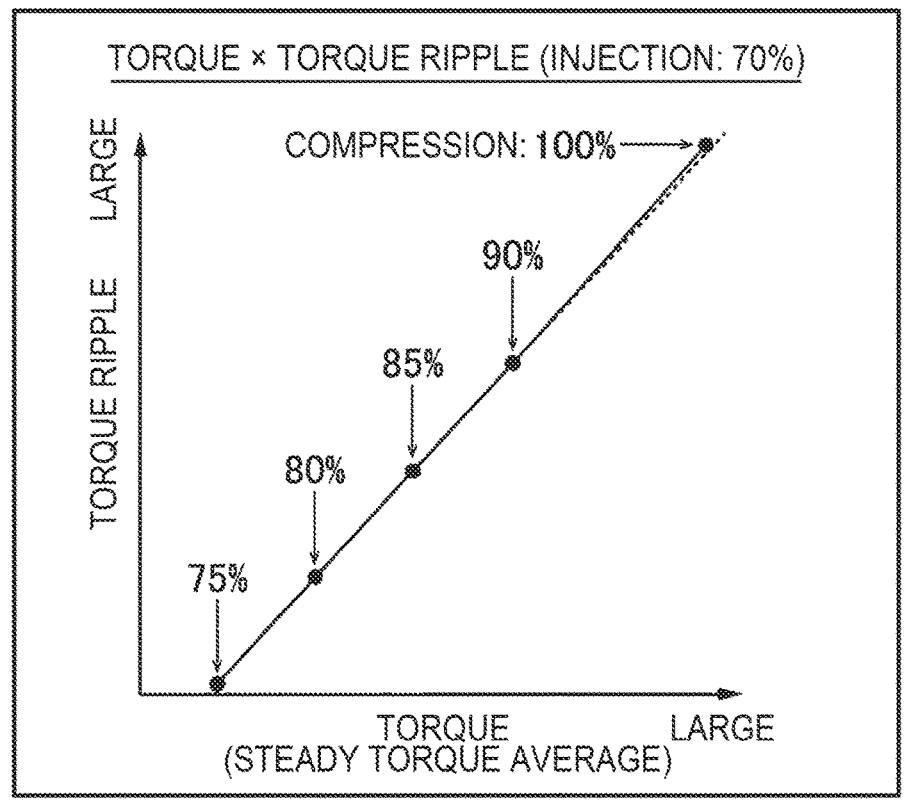
FIG. 3E is a third diagram showing a result of simulation of the torque ripple when the ratio of the magnetic material in the compression bonded magnet of the rotor core is changed according to the first embodiment.
Figure 3F:
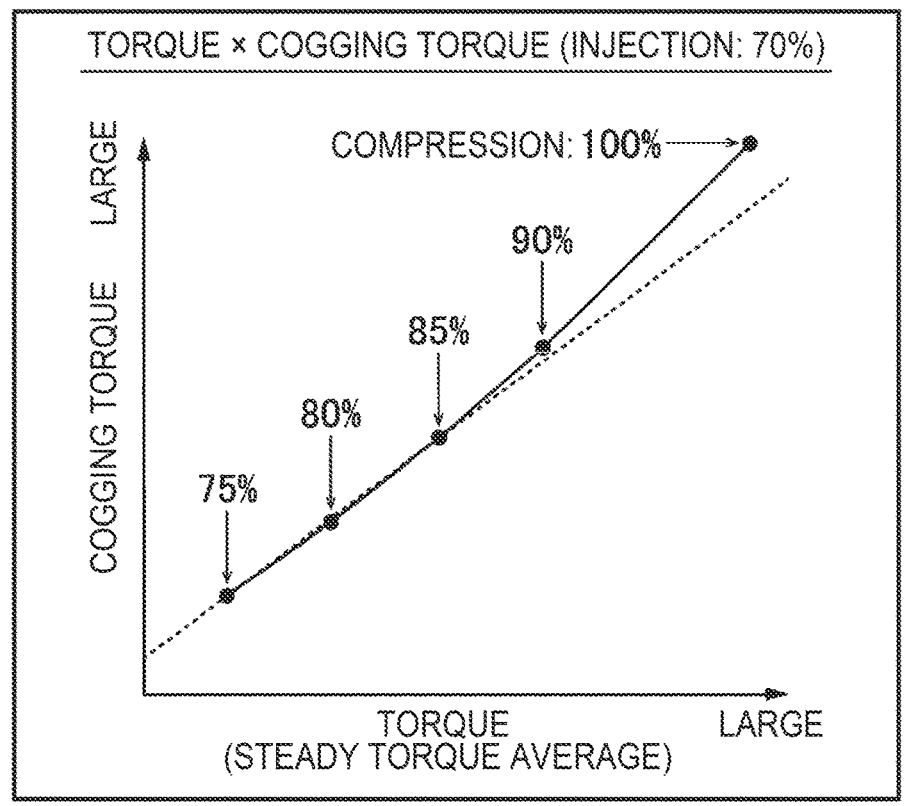
FIG. 3F is a third diagram showing a result of simulation of the cogging torque when the ratio of the magnetic material in the compression bonded magnet of the rotor core is changed according to the first embodiment.

As shown in FIG. 3E, when the ratio of the magnetic material in the injection bonded magnet 12b is 70% and the ratio of the magnetic material in the compression bonded magnet 12a changes, the magnitude of the torque ripple is distributed along a proportional line (dashed line in the figure) approximately in proportion to the magnitude of the torque when the ratio of the magnetic material in the compression bonded magnet 12a is 90% or less. When the ratio of the magnetic material in the compression bonded magnet 12a is more than 90%, the magnitude of the torque ripple is distributed so as to gradually deviate from the proportional line as the ratio of the magnetic material in the compression bonded magnet 12a increases. This means that, when the ratio of the magnetic material in the injection bonded magnet 12b is 70% and the ratio of the magnetic material in the compression bonded magnet 12a is more than 90%, the magnitude of the torque ripple excessively increases relative to the magnitude of the torque. As shown in FIG. 3F, when the ratio of the magnetic material in the injection bonded magnet 12b is 70% and the ratio of the magnetic material in the compression bonded magnet 12a changes, the magnitude of the cogging torque is distributed along a proportional line (dashed line in the figure) approximately in proportion to the magnitude of the torque when the ratio of the magnetic material in the compression bonded magnet 12a is 90% or less. When the ratio of the magnetic material in the compression bonded magnet 12a is more than 90%, the magnitude of the cogging torque is distributed so as to gradually deviate from the proportional line as the ratio of the magnetic material in the compression bonded magnet 12a increases. This means that, when the ratio of the magnetic material in the injection bonded magnet 12b is 70% and the ratio of the magnetic material in the compression bonded magnet 12a is more than 90%, the magnitude of the cogging torque excessively increases relative to the magnitude of the torque. Therefore, when the ratio of the magnetic material in the injection bonded magnet 12b is 70%, the excessive increase in the torque ripple and the cogging torque can be prevented by setting the ratio of the magnetic material in the compression bonded magnet 12a to 90% or less.

In the first embodiment, the volume ratio of the compression bonded magnet 12a in the permanent magnet 12 is larger than the volume ratio of the injection bonded magnet 12b in the permanent magnet 12. Specifically, in a state in which the compression bonded magnet 12a is disposed in the magnet hole portion 11b so as to occupy the majority of the magnet hole portion 11b, the injection bonded magnet 12b is formed by injection molding so as to fill a gap in the magnet hole portion 11b where the compression bonded magnet 12a is not disposed. Therefore, the volume ratio of the compression bonded magnet 12a in the permanent magnetic 12 in which the ratio of the magnetic material can be increased compared to the injection bonded magnet 12b is relatively large. Thus, the ratio of the magnetic material in the permanent magnet 12 can be increased effectively.

The compression-molding resin material is a thermosetting resin material. The injection-molding resin material is a thermosetting resin material or a thermoplastic resin material. The thermosetting resin material is, for example, an epoxy resin. The thermoplastic resin material is, for example, polyphenylene sulfide (PPS) or nylon.

The thermoplastic resin material reversibly changes between a solid state and a liquid state at a melting temperature (for example, 290° C. in the case of PPS). The thermosetting resin material is solid or liquid at room temperature. The thermosetting resin material maintains a molten state at a temperature equal to or higher than the melting temperature and equal to or lower than a curing temperature (for example, 120° C. to 150° C. in the case of epoxy resin) higher than the melting temperature. The thermosetting resin material is cured by being heated to a temperature higher than the curing temperature. Once the thermosetting resin material is cured, it maintains its cured state (changes irreversibly) regardless of the temperature.

The thermoplastic resin material and the thermosetting resin material are thermally decomposed (progress of oxidation reaction causes defects in a polymer skeleton) at a decomposition temperature (for example, 500° C. in the case of PPS) higher than the melting temperature and a decomposition temperature (for example, 250° C. to 350° C. in the case of epoxy resin) higher than the curing temperature. Therefore, when the compression-molding material 61a (see FIG. 6) containing the compression-molding resin material and the injection-molding material 61b (see FIG. 3) containing the injection-molding resin material are heated simultaneously (injection molding step S140 (injection bonded magnet molding step) in a method for manufacturing the rotor core 10 described later (see FIG. 5)), the compression-molding material 61a and the injection-molding material 61b need to be selected so that the above decomposition temperatures are not exceeded.

For example, when PPS that is the thermoplastic resin material is selected as the injection-molding material 61b (see FIG. 4) to be included in the injection bonded magnet 12b, the melting temperature of PPS is 290° C. as described above. Therefore, heating is needed to a temperature equal to or higher than 290° C. to melt PPS during the injection molding. In this case, it is preferable to select a thermosetting resin material having a decomposition temperature higher than 290° C. as the compression bonded magnet 12a that is heated simultaneously. Therefore, it is difficult to select the epoxy resin having a decomposition temperature of 250° C. to 350° C. as described above as the thermosetting resin material to be heated simultaneously with PPS. A difference in temperature conditions between the thermosetting resin materials is smaller than a difference between the thermosetting resin material and the thermoplastic resin material. Therefore, the thermosetting resin material is easier to handle as the injection-molding material 61b than the thermoplastic resin material.

(Detailed Configuration of Jig)

Next, the jig 20 to be used for manufacturing the rotor core 10 of the first embodiment will be described with reference to FIG. 2. The jig 20 is provided to keep the stacked core 11 pressed in the injection molding step S140 (injection bonded magnet molding step) in the manufacturing flow of the rotor core 10 described later. The following description will be given about the structure of the jig 20 with the stacked core 11 disposed in the jig 20.

As shown in FIG. 2, the jig 20 includes an upper plate 21, a pressing spring 22, a pressing plate 23, a lower plate 24, a heat insulating member 25, a positioning plate 26, and a clamp member 27. Each of the upper plate 21, the pressing plate 23, the lower plate 24, and the positioning plate 26 is made of SUS (stainless steel).

The upper plate 21 has a through hole 21a in the center and is formed in an annular shape when viewed in the Z direction. The upper plate 21 has a plurality of resin injection holes 21b. The resin injection holes 21b are provided so that die nozzles 122 (see FIG. 4) of a resin injection device 30 (see FIG. 4) described later can be inserted therethrough. The resin injection holes 21b are provided so as to overlap the plurality of (32) magnet hole portions 11b when viewed in the Z direction.

The pressing spring 22 is provided between the upper plate 21 and the pressing plate 23. A plurality of the pressing springs 22 is provided at equal angular intervals in the C direction when viewed in the Z direction. The jig 20 includes a plurality of (four) pressing springs 22. Each of the plurality of (four) pressing springs 22 is provided at such a position that the pressing spring 22 overlaps the stacked core 11 when viewed from the Z1 side with the stacked core 11 disposed in the jig 20.

The pressing plate 23 is disposed on an upper end face 11c of the stacked core 11. The pressing plate 23 is provided so as to press the upper end face 11c of the stacked core 11 by an urging force of the pressing springs 22.

The pressing plate 23 has a through hole 23a in the center and is formed in an annular shape when viewed in the Z direction. The pressing plate 23 has a plurality of resin injection holes 23b. The plurality of resin injection holes 23b is provided at such a position that the plurality of resin injection holes 23b overlaps the plurality of resin injection holes 21b of the upper plate 21 when viewed from the Z1 side. The plurality of resin injection holes 23b is provided so that the die nozzles 122 (see FIG. 4) of the resin injection device 30 (see FIG. 4) described later can be inserted therethrough.

The lower plate 24 is in contact with a lower end face 11d of the stacked core 11. That is, the stacked core 11 is disposed (placed) on the lower plate 24. The lower plate 24 has a through hole 24a in the center and is formed in an annular shape when viewed in the Z direction. The lower plate 24 includes a plurality of (three) cut portions 24b. The plurality of cut portions 24b is provided at substantially equal angular intervals at the inner peripheral edge of the through hole 24a. An L-shaped positioning portion 24c is provided in each of the plurality of cut portions 24b. The positions of the stacked core 11 in the R and C directions with respect to the lower plate 24 are determined by the plurality of positioning portions 24c. The positioning portions 24c are fixed (fastened) to the lower plate 24 by fastening bolts 24d.

The heat insulating member 25 is provided so as to be sandwiched between the lower plate 24 and the positioning plate 26. The heat insulating member 25 has a through hole 25a in the center and is formed in an annular shape when viewed in the Z direction. The heat insulating member 25 is made of resin.

The positioning plate 26 is provided on the Z2 side of the lower plate 24. The positioning plate 26 is used for positioning the jig 20 in the resin injection device 30.

The clamp member 27 has a U-shape and is provided so as to hold the upper plate 21 and the lower plate 24 together. Thus, the upper plate 21 and the lower plate 24 sandwich the stacked core 11 under pressure therebetween. That is, the stacked core 11 is pressed by the jig 20. A plurality of (four) the clamp members 27 is provided. The plurality of (four) clamp members 27 is provided at substantially equal angular intervals (that is, 90° intervals) in the C direction when viewed in the Z direction.

(Detailed Configuration of Resin Injection Device)

Next, a detailed configuration of the resin injection device 30 will be described with reference to FIG. 4. The resin injection device 30 is provided to inject the molten injection-molding material 61b (see FIG. 4) into the magnet hole portions 11b (see FIG. 2) in the injection molding step S140 (injection bonded magnet molding step) in the manufacturing flow of the rotor core 10 described later. That is, the resin injection device 30 is an injection molding machine.

Figure 4:
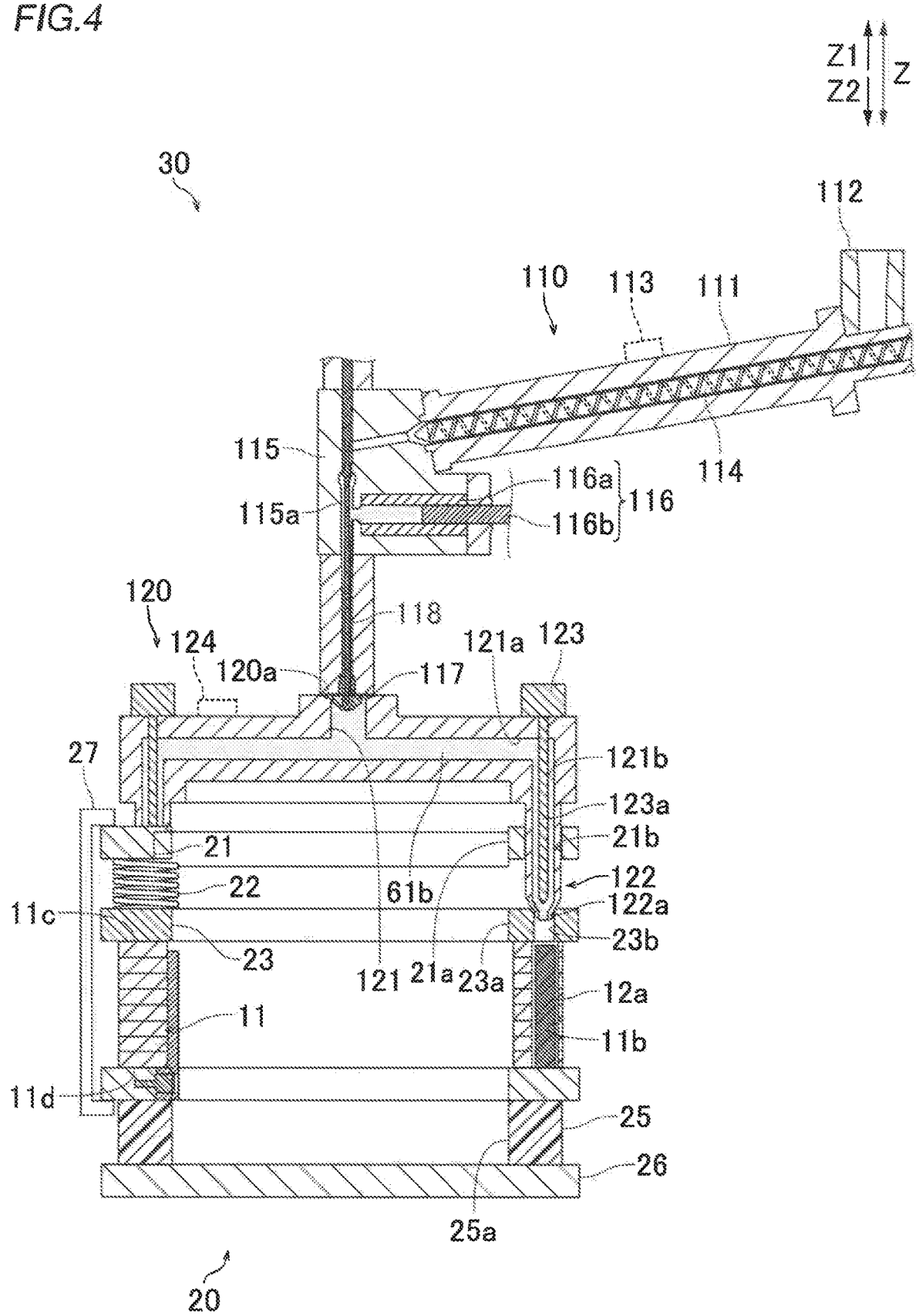
FIG. 4 is a sectional view showing the configuration of a resin injection device according to the first embodiment.

As shown in FIG. 4, the resin injection device 30 includes a plasticizing unit 110 and the die nozzles 122.

The plasticizing unit 110 includes a plasticizing cylinder 111. The plasticizing cylinder 111 has a tubular shape. A resin inlet 112 is provided at a root side of the plasticizing cylinder 111. The solid or liquid injection-molding material 61b is charged into the plasticizing cylinder 111 through the resin inlet 112.

A heating device 113 is provided outside the plasticizing cylinder 111. The heating device 113 heats the plasticizing cylinder 111 so that the temperature of the injection-molding material 61b charged into the plasticizing cylinder 111 is maintained to be the melting temperature or higher when the thermoplastic resin material is contained, or to be the melting temperature or higher and the curing temperature or lower when the thermosetting resin material is contained.

The injection-molding material 61b is also heated by rotation in a screw portion 114 described later.

The screw portion 114 is provided inside the plasticizing cylinder 111. The screw portion 114 is rotated by a drive device (not shown). The screw portion 114 rotates about a central axis of the tubular plasticizing cylinder 111 as a rotation axis. By rotating the screw portion 114, the molten injection-molding material 61b is transferred to a tip side of the plasticizing cylinder 111.

The plasticizing unit 110 includes a manifold portion 115. The manifold portion 115 is provided on the tip side of the plasticizing cylinder 111. The manifold portion 115 includes a plunger portion 116 including a cylinder 116a and a piston 116b. The cylinder 116a has a cylindrical shape. The inside of the plasticizing cylinder 111 and the inside of the cylinder 116a are connected by an intra-manifold channel 115a extending in the Z direction. The inside of the cylinder 116a is connected to the intra-manifold channel 115a at a substantially central portion of the intra-manifold channel 115a extending in the Z direction.

The piston 116b has a circular outer peripheral surface when viewed in an axial direction of the cylinder 116a. The piston 116b moves inside the cylinder 116a in the axial direction of the cylinder 116a. By retracting the piston 116b (moving opposite to the intra-manifold channel 115a), the inside of the cylinder 116a is filled with the molten injection-molding material 61b flowing through the intra-manifold channel 115a. By advancing the piston 116b (moving toward the intra-manifold channel 115a), the injection-molding material 61b that fills the cylinder 116a is injected into the intra-manifold channel 115a. The injection-molding material 61b injected into the intra-manifold channel 115a flows toward an injection nozzle 117 provided on a tip side (Z2 side) of the intra-manifold channel 115a.

The injection nozzle 117 supplies the injection-molding material 61b injected from the cylinder 116a into the intra-manifold channel 115a by advancing the piston 116b to a die portion 120 disposed on the Z2 side of the plasticizing unit 110. Similarly to the plasticizing cylinder 111, the manifold portion 115 is heated so that the temperature of the injection-molding material 61b accommodated in the manifold portion 115 is maintained to be the melting temperature or higher when the thermoplastic resin material is contained, or to be the melting temperature or higher and the curing temperature or lower when the thermosetting resin material is contained.

An injection valve pin 118 is provided in the intra-manifold channel 115a. The injection valve pin 118 is open when the injection-molding material 61b is ejected from the injection nozzle 117. The injection valve pin 118 is closed when the injection-molding material 61b is not ejected from the injection nozzle 117. FIG. 4 shows a case where the injection valve pin 118 is closed.

The die portion 120 is supplied with the injection-molding material 61b from the plasticizing unit 110. A channel 121 through which the injection-molding material 61b flows is provided inside the die portion 120. The channel 121 branches into a plurality of intra-die channels 121a toward the stacked core 11. Intra-die nozzle channels 121b on the stacked core 11 side (Z2 side) of the channel 121 connected to the intra-die channels 121a are provided at positions corresponding to the magnet hole portions 11b of the stacked core 11.

The die nozzles 122 are provided in the die portion 120. The die nozzles 122 are provided on a tip side of the channel 121 (intra-die nozzle channels 121b). When injecting the injection-molding material 61b into the magnet hole portions 11b, the tip of the injection nozzle 117 (end on the Z2 side) of the plasticizing unit 110 is connected to a hole portion 120a (provided at an end opposite to the tip side of the channel 121) of the die portion 120. With the tip of the injection nozzle 117 connected to the hole portion 120a of the die portion 120, the injection-molding material 61b accommodated in the channel 121 is injected from the die nozzles 122 of the die portion 120 into the magnet hole portions 11b of the stacked core 11 by being pushed by the injection-molding material 61b supplied to the die portion 120 by the piston 116b via the injection nozzle 117.

Die valves 123 are provided in the intra-die nozzle channels 121b. The die valves 123 are open when the injection-molding material 61b is ejected from the die nozzles 122. The die valves 123 are closed when the injection-molding material 61b is not ejected from the die nozzles 122. The die valve 123 includes a die valve pin 123a. By closing a tip 122a of the die nozzle 122 with the die valve pin 123a, injection of the injection-molding material 61b from the die nozzle 122 is blocked.

A die temperature control device 124 is provided outside the die portion 120. The die temperature control device 124 heats the die portion 120 so that the temperature of the injection-molding material 61b accommodated in the die portion 120 is maintained to be the melting temperature or higher when the thermoplastic resin material is contained, or to be the melting temperature or higher and the curing temperature or lower when the thermosetting resin material is contained.

(Method for Manufacturing Rotor Core)

Next, the method for manufacturing the rotor core 10 will be described with reference to FIGS. 5 to 9.

<Compression Bonded Magnet Molding Step>

First, as shown in FIG. 5, a compression molding step S110 (compression bonded magnet molding step) is performed to form the compression bonded magnets 12a (see FIG. 2) by compression-molding the compression-molding material 61a (see FIG. 6).

Figure 6A:
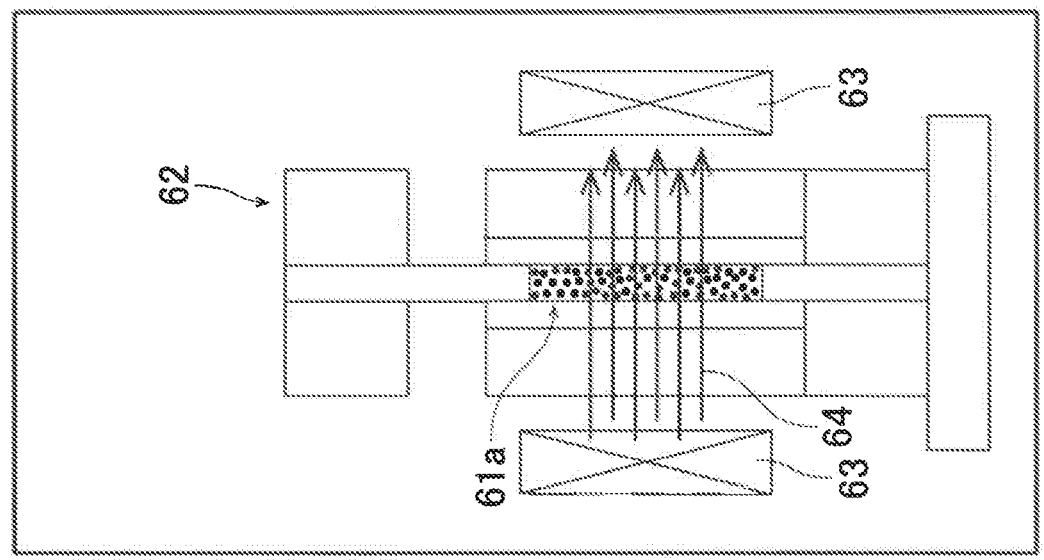
FIG. 6A is a first diagram illustrating a compression bonded magnet molding step in the method for manufacturing the rotor core according to the first embodiment.
Figure 6B:
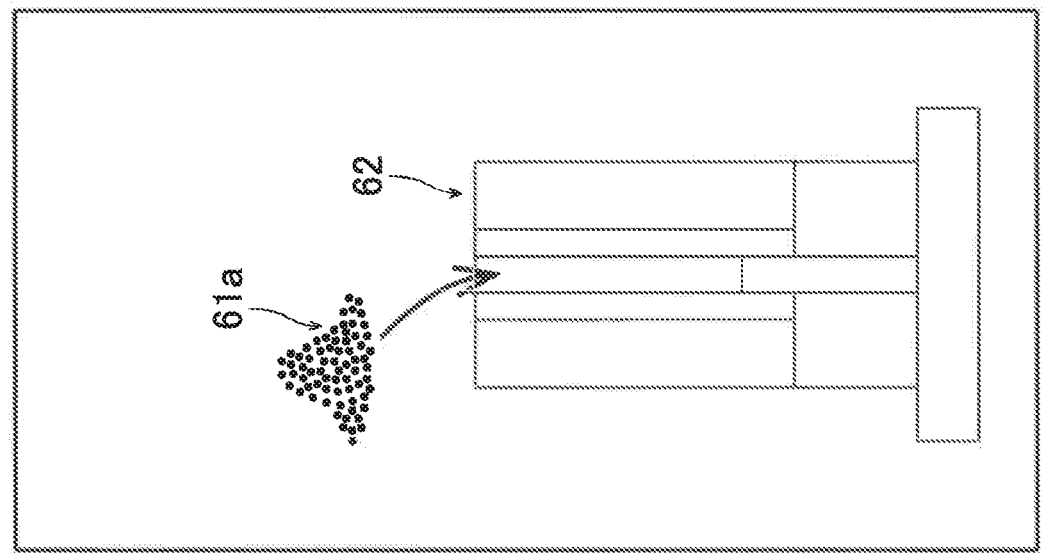
FIG. 6B is a second diagram illustrating the compression bonded magnet molding step in the method for manufacturing the rotor core according to the first embodiment.

Specifically, as shown in FIG. 6A, the powder of the compression-molding material 61a is fed (supplied) to a compression-molding die 62. As shown in FIG. 6B, a magnetic field 64 for magnetization orientation is applied to the compression-molding material 61a by using an electromagnet 63 while heating is performed so that the temperature of the compression-molding material 61a changes relatively gently to the melting temperature. As a result, the temperature change of the compression-molding material 61a is relatively small. Thus, generation of thermal stress in the compression-molding material 61a can be suppressed.

As shown in FIG. 6C, the magnetic field 64 remains applied to the compression-molding material 61a while the compression-molding material 61a is heated and pressurized at a temperature equal to or higher than the melting temperature and equal to or lower than the curing temperature of the thermosetting compression-molding resin material. As a result, in the compression molding step S110, the compression-molding material 61a is not cured (thermally cured) but compacted (green compact) and magnetized in an oriented state. That is, in the first embodiment, the compression molding step S110 is a step of forming the compression bonded magnet 12a by compression molding without curing the thermosetting compression-molding material 61a at a temperature at which it is not cured.

As shown in FIG. 6D, the compression bonded magnet 12a obtained by compression-molding the compression-molding material 61a is taken out from the compression-molding die 62. Since the compression bonded magnet 12a is not cured at this time (green compact), the compression bonded magnet 12a is taken out from the compression-molding die 62 while being, for example, chucked so as to be wrapped entirely or attracted to a magnet clamp so as not to collapse the compression bonded magnet 12a.

<Stacked Core Forming Step>

Next, as shown in FIG. 5, a stacked core forming step S120 is performed to form the stacked core 11 (see FIG. 2). Specifically, the stacked core 11 (see FIG. 2) is formed by stacking the plurality of electromagnetic steel sheets 11a (see FIG. 2). At this time, the magnet hole portions 11b (see FIG. 2) extending in the stacking direction of the electromagnetic steel sheets 11a (Z direction) are formed in the stacked core 11 by press working. The order of the stacked core forming step S120 and the compression molding step S110 may be reversed.

<Compression Bonded Magnet Disposing Step>

Figure 7A:
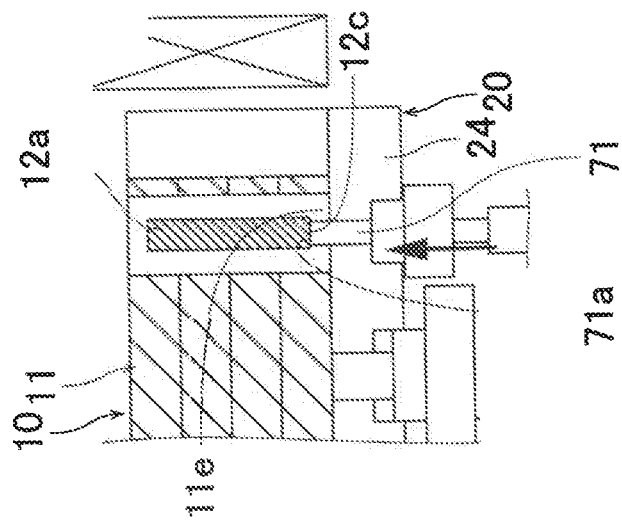
FIG. 7A is a first diagram illustrating a compression bonded magnet disposing step in the method for manufacturing the rotor core according to the first embodiment.

Next, as shown in FIG. 5, a disposing step S130 (compression bonded magnet disposing step) is performed to dispose the compression bonded magnet 12a (see FIG. 7) on the inner side in the magnet hole portion 11b of the rotor core 10. Specifically, as shown in FIG. 2, the stacked core 11 is first disposed (placed) on the lower plate 24 of the jig 20 so that the axial direction (Z direction) of the rotor core 10 corresponds to a vertical direction. As shown in FIG. 7A, a lower magnet ejector pin 71 that moves in the vertical direction (Z direction) by an actuator that slides in the vertical direction (Z direction) is inserted into the magnet hole portion 11b from a lower side (Z2 side) of the magnet hole portion 11b. At this time, the lower magnet ejector pin 71 is inserted into the magnet hole portion 11b so that a tip 71a of the lower magnet ejector pin 71 is spaced inwardly away from a hole end 11e of the magnet hole portion 11b (on the Z2 side) by a predetermined distance. That is, in the first embodiment, the disposing step S130 is a step of disposing the compression bonded magnet 12a in the magnet hole portion 11b of the rotor core 10 by the lower magnet ejector pin 71 so that a magnet end 12c of the compression bonded magnet 12a on the other side (Z2 side) opposite to one side (Z1 side) where the injection-molding material 61b (see FIG. 4) is injected is spaced inwardly in the axial direction (Z direction) of the rotor core 10 from the hole end 11e of the magnet hole portion 11b on the other side (Z2 side). The lower magnet ejector pin 71 is an example of a "jig" in the claims.

Figure 7B:
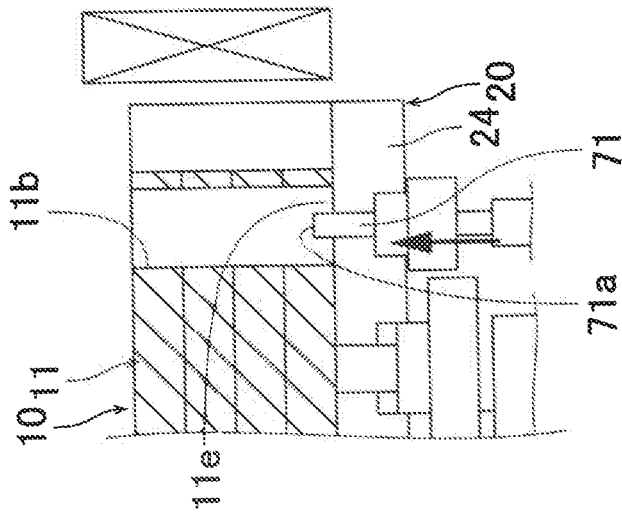
FIG. 7B is a second diagram illustrating the compression bonded magnet disposing step in the method for manufacturing the rotor core according to the first embodiment.

As shown in FIG. 7B, the compression bonded magnet 12a is disposed in the magnet hole portion 11b with the stacked core 11 disposed on the lower plate 24 of the jig 20. As shown in FIG. 2, the lower plate 24 and the upper plate 21 of the jig 20 are clamped (connected) by the clamp member 27, and the upper end face 11c of the stacked core 11 is pressed by the pressing plate 23. In the method for manufacturing the rotor core 10, the stacked core 11 is pressed by the jig 20 until the injection molding step S140 (see FIG. 5) is finished after the stacked core 11 is disposed on the jig 20 in the disposing step S130 (see FIG. 5).

<Injection Bonded Magnet Molding Step>

Next, as shown in FIG. 5, the injection molding step S140 (injection bonded magnet molding step) is performed to form the injection bonded magnet 12b (see FIG. 4) by injection molding so that the injection-molding material 61b (see FIG. 4) is injected into a gap in the magnet hole portion 11b (see FIG. 4) where the compression bonded magnet 12a is not disposed. As a result, the compression bonded magnet 12a does not require fluidity and the ratio of the magnetic material can be increased unlike the injection bonded magnet 12b. Thus, the ratio of the magnetic material in the permanent magnet 12 (see FIG. 4) can be increased compared to a case where the second injection bonded magnet is molded in a gap in the magnet hole portion 11b where the first injection bonded magnet is not disposed. The bonded magnet (compression bonded magnet 12a) to be formed first in the magnet hole portion 11b among the bonded magnets constituting the permanent magnet 12 is formed by compression molding. Therefore, it is possible to reduce variations in the shape and weight of the compression bonded magnet 12a in each magnet hole portion 11b. Unlike sintered magnets, the compression bonded magnet 12a does not require heat treatment for optimizing the crystal structure, surface treatment for polishing a rough surface, and the like. Therefore, the manufacturing process is less complicated. As a result, the motor performance can be improved while preventing the complication of the manufacturing process when the permanent magnets 12 are formed by the bonded magnets.

In the first embodiment, the injection molding step S140 is a step of forming the injection bonded magnet 12b (see FIG. 4) by injection molding so that the injection-molding material 61b (see FIG. 4) is injected into the magnet hole portion 11b so as to surround the compression bonded magnet 12a (see FIG. 4) disposed in the magnet hole portion 11b (see FIG. 4). Unlike the injection bonded magnet 12b (see FIG. 4), the compression bonded magnet 12a is likely to rust if it remains exposed due to the gap present in the compression molding. However, the compression bonded magnet 12a can be prevented from rusting because the injection molding is performed so as to surround the compression bonded magnet 12a by the injection bonded magnet 12b. As a result, there is no need to perform a rust inhibiting step for the compression bonded magnet 12a even when the compression bonded magnet 12a is used as a part of the permanent magnet 12 (see FIG. 4).

The injection-molding material 61b used in the injection molding step S140 contains the magnetic material and the thermosetting resin material, or contains the magnetic material and the thermoplastic resin material. As a result, the injection bonded magnet 12b can be molded regardless of whether the injection-molding material 61b to be used contains the thermosetting resin material or the thermoplastic resin material.

As shown in FIG. 8, in the first embodiment, the injection molding step S140 is a step of injecting the injection-molding material 61b into the magnet hole portion 11b so that the injection-molding material 61b flows to the hole end 11e of the magnet hole portion 11b (back side (Z2 side) of the magnet hole portion 11b when viewed from the side where the injection-molding material 61b is injected (Z1 side)) in a state in which the magnet end 12c of the compression bonded magnet 12a is spaced inwardly in the axial direction (Z direction) from the hole end 11e of the magnet hole portion 11b by the jig 20 (see FIG. 2). As a result, the injection-molding material 61b is injected so as to flow to the back side of the compression bonded magnet 12a when viewed from the injection side. Thus, the injection bonded magnet 12b can easily be molded so as to surround the compression bonded magnet 12a.

Figure 8A:
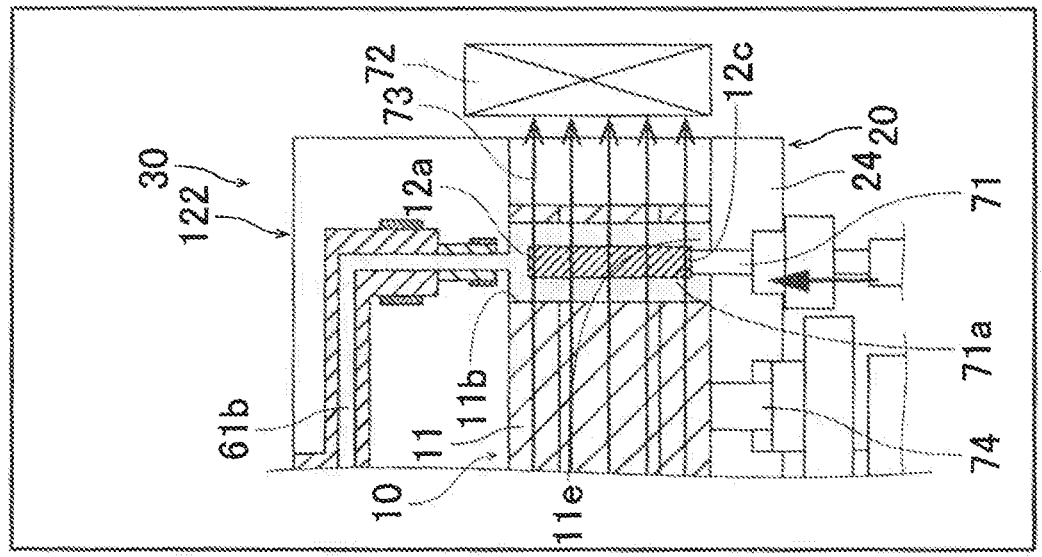
FIG. 8A is a first diagram illustrating an injection bonded magnet molding step in the method for manufacturing the rotor core according to the first embodiment.
Figure 8B:
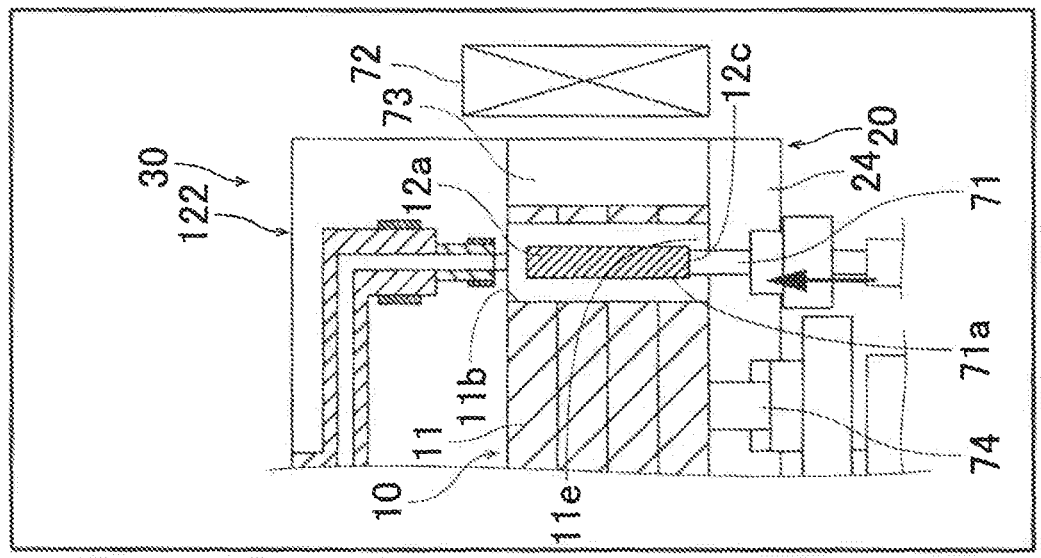
FIG. 8B is a second diagram illustrating the injection bonded magnet molding step in the method for manufacturing the rotor core according to the first embodiment.

Specifically, as shown in FIG. 8A, the die nozzle 122 of the resin injection device 30 is first disposed in the resin injection hole 23b (see FIG. 2) (the die is closed). As a result, the injection-molding material 61b can be injected into the magnet hole portion 11b by the resin injection device 30. As shown in FIG. 8B, the injection-molding material 61b melted by heating is injected from the resin injection device 30 into the magnet hole portion 11b where the compression bonded magnet 12a is disposed. At this time, an electromagnet 72 is used to apply a magnetic field 73 for magnetization orientation to the injection-molding material 61b.

Figure 8C:
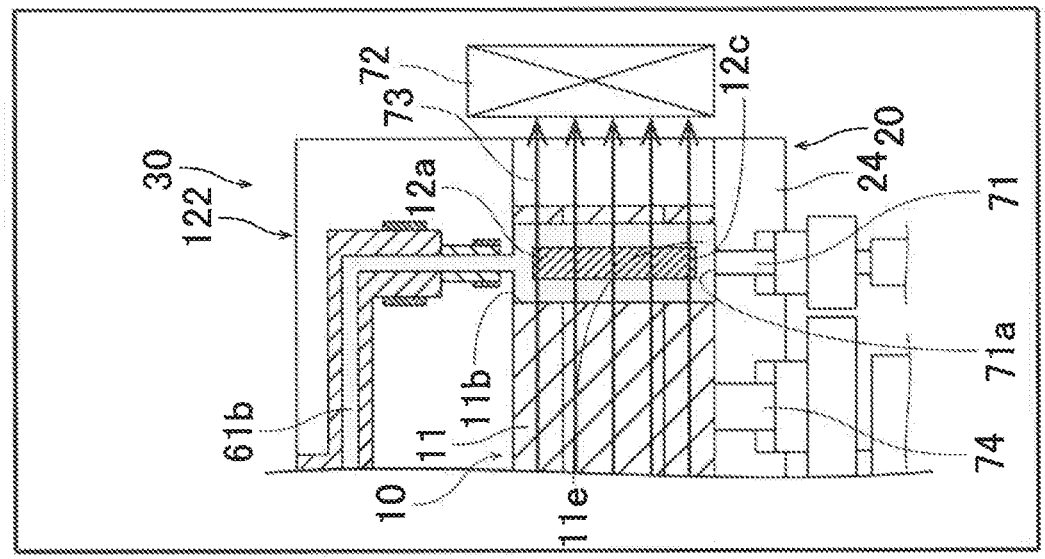
FIG. 8C is a third diagram illustrating the injection bonded magnet molding step in the method for manufacturing the rotor core according to the first embodiment.

As shown in FIG. 8C, the lower magnet ejector pin 71 is retracted downward (to the Z2 side) (retracted from the magnet hole portion 11b) after the injection-molding material 61b reaches the lower side (Z2 side) in the magnet hole portion 11b while maintaining the state in which the magnetic field 73 is applied to the injection-molding material 61b. The injection-molding material 61b is not cured at the stage in which the lower magnet ejector pin 71 is retracted downward (to the Z2 side). However, a relatively high pressure is applied to the injection-molding material 61b injection-molded by the resin injection device 30, and the difference between the specific gravity of the compression bonded magnet 12a and the specific gravity of the injection-molding material 61b (injection bonded magnet 12b) is relatively small. Therefore, even when the lower magnet ejector pin 71 is retracted downward (to the Z2 side), the compression bonded magnet 12a remains away from the lower end of the magnet hole portion 11b (does not sink to the Z2 side in the injection-molding material 61b).

Figure 8D:
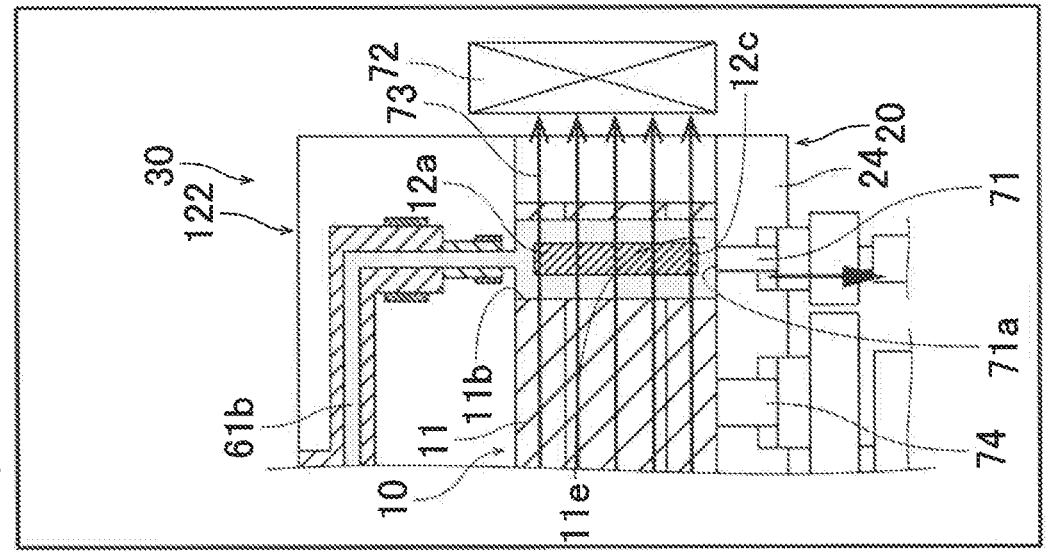
FIG. 8D is a fourth diagram illustrating the injection bonded magnet molding step in the method for manufacturing the rotor core according to the first embodiment.

As shown in FIG. 8D, the injection-molding material 61b injected into the magnet hole portion 11b so as to surround the compression bonded magnet 12a is solidified (when the injection-molding material 61b containing the thermoplastic resin material is used) or cured (when the injection-molding material 61b containing the thermosetting resin material is used) while maintaining the state in which the magnetic field 73 is applied to the injection-molding material 61b. At this time, the compression bonded magnet 12a that is not cured in the compression molding step S110 is also cured simultaneously.

Specifically, when the injection-molding material 61b containing the magnetic material and the thermosetting resin material is used, the compression bonded magnet 12a that is a green compact is maintained, in the magnet hole portion 11b, at a temperature equal to or lower than the curing temperature (for example, 120° C. to 150° C. in the case of epoxy resin) of the thermosetting resin material contained in the compression bonded magnet 12a, and the injection-molding material 61b is maintained, in the resin injection device 30, at a temperature equal to or higher than the melting temperature of the thermosetting resin material contained in the injection-molding material 61b and equal to or lower than the curing temperature (for example, 120° C. to 150° C. in the case of epoxy resin) of the thermosetting resin material contained in the injection-molding material 61b. Substantially simultaneously with the injection of the injection-molding material 61b into the magnet hole portion 11b, the temperatures of the injection-molding material 61b and the compression bonded magnet 12a are controlled to be temperatures higher than the curing temperature (for example, 120° C. to 150° C. in the case of epoxy resin) of the thermosetting resin material contained in the injection-molding material 61b and the curing temperature (for example, 120° C. to 150° C. in the case of epoxy resin) of the thermosetting resin material contained in the compression bonded magnet 12a. As a result, the compression bonded magnet 12a containing the thermosetting resin material is cured substantially simultaneously with the curing of the injection-molding material 61b containing the thermosetting resin material.

When the injection-molding material 61b containing the magnetic material and the thermoplastic resin material is used, the compression bonded magnet 12a that is a green compact is maintained, in the magnet hole portion 11b, at a temperature equal to or lower than the curing temperature (for example, 120° C. to 150° C. in the case of epoxy resin) of the thermosetting resin material contained in the compression bonded magnet 12a, and the injection-molding material 61b is maintained, in the resin injection device 30, at a temperature higher than the melting temperature (for example, 290° C. in the case of PPS) of the thermoplastic resin material contained in the injection-molding material 61b. The melting temperature (for example, 290° C. in the case of PPS) of the thermoplastic resin material contained in the injection-molding material 61b is higher than the curing temperature (for example, 120° C. to 150° C. in the case of epoxy resin) of the thermosetting resin material contained in the compression bonded magnet 12a. Substantially simultaneously with the injection of the injection-molding material 61b into the magnet hole portion 11b, the temperatures of the injection-molding material 61b and the compression bonded magnet 12a are controlled to be temperatures equal to or higher than the curing temperature (for example, 120° C. to 150° C. in the case of epoxy resin) of the thermosetting resin material contained in the compression bonded magnet 12a and lower than the melting temperature (for example, 290° C. in the case of PPS) of the thermoplastic resin material contained in the injection-molding material 61b. As a result, the compression bonded magnet 12a containing the thermosetting resin material is cured substantially simultaneously with the solidification of the injection-molding material 61b containing the thermoplastic resin material.

That is, in the first embodiment, the injection molding step S140 is a step of performing injection molding so as to inject the injection-molding material 61b into the magnet hole portion 11b at a temperature at which the injection-molding material 61b is cured together with the compression bonded magnet 12a compression-molded without curing, thereby molding the injection bonded magnet 12b so as to solidify it along with the curing of the compression bonded magnet 12a. As a result, the compression bonded magnet 12a can be cured and the injection bonded magnet 12b can be solidified by heating at one time. Thus, the number of steps can be reduced compared to a case where heating for curing the compression bonded magnet 12a and heating for solidifying the injection bonded magnet 12b are performed separately.

Figure 9A:
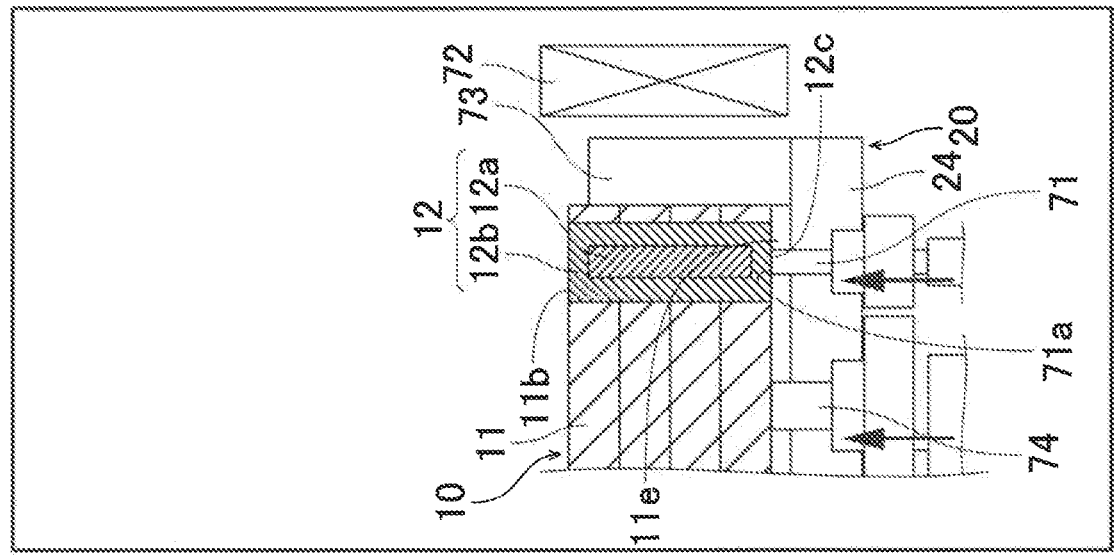
FIG. 9A is a first diagram illustrating the injection bonded magnet molding step in the method for manufacturing the rotor core according to the first embodiment.
Figure 9B:
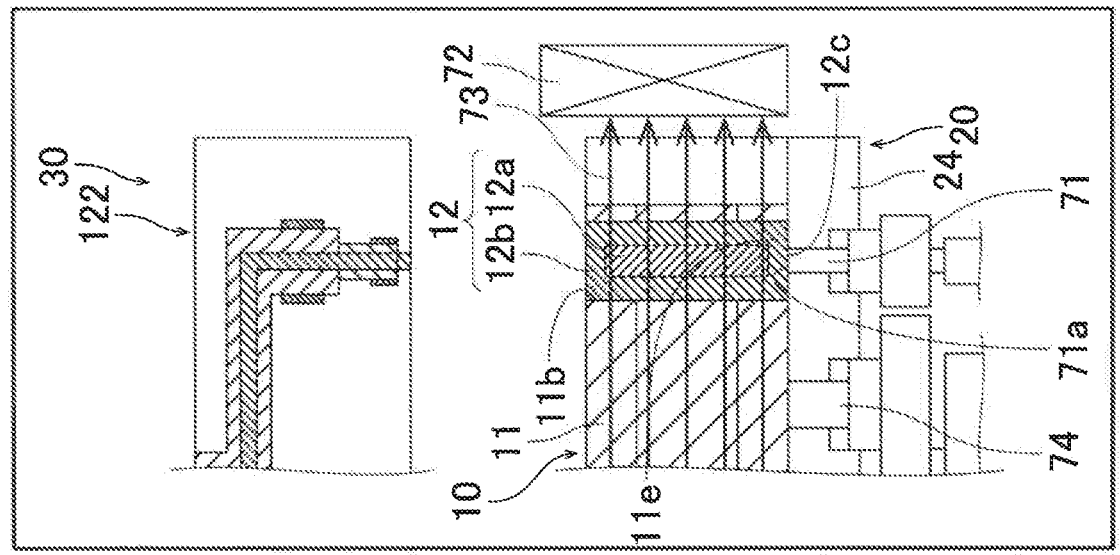
FIG. 9B is a second diagram illustrating the injection bonded magnet molding step in the method for manufacturing the rotor core according to the first embodiment.
Figure 9C:
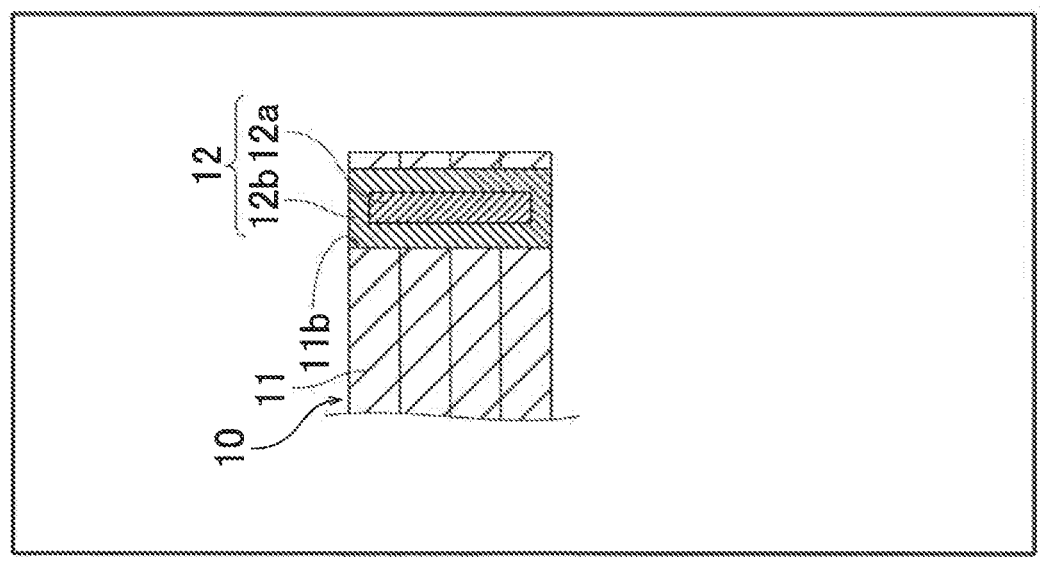
FIG. 9C is a third diagram illustrating the injection bonded magnet molding step in the method for manufacturing the rotor core according to the first embodiment.

After the compression bonded magnet 12a is cured substantially simultaneously with the solidification or curing of the injection-molding material 61b, the (non-magnetized) permanent magnet 12 including the compression bonded magnet 12a and the injection bonded magnet 12b is formed. Then, the permanent magnet 12 is cooled. As shown in FIG. 9A, the application of the magnetic field 73 to the injection-molding material 61b by the electromagnet 72 is stopped, and the die nozzles 122 of the resin injection device 30 are removed from the resin injection holes 23b (see FIG. 2) (the die is opened). As shown in FIG. 9B, a lower core ejector pin 74 that is disposed below (on the Z2 side of) the stacked core 11 and moved in the vertical direction (Z direction) by an actuator that slides in the vertical direction (Z direction) presses the stacked core 11 from the lower side (Z2 side) to take out the stacked core 11 from the jig 20. At this time, the lower magnet ejector pin 71 presses each permanent magnet 12 from the lower side (Z2 side) simultaneously with the lower core ejector pin 74. As shown in FIG. 9C, the stacked core 11 is taken out from the jig 20.

<Permanent Magnet Magnetizing Step>

Figure 9D:
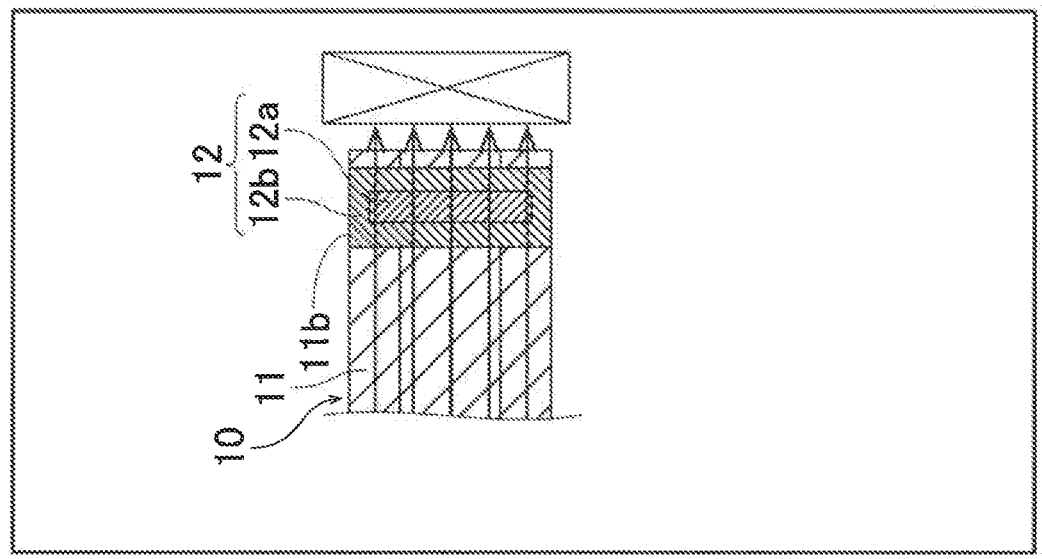
FIG. 9D is a diagram illustrating a permanent magnet magnetizing step in the method for manufacturing the rotor core according to the first embodiment.

Next, as shown in FIGS. 5 and 9D, a magnetizing step S150 (permanent magnet magnetizing step) is performed to magnetize the bonded magnets serving as the permanent magnet 12 disposed in the magnet hole portion 11b.

Second Embodiment

A configuration of a rotor core 210 according to a second embodiment will be described with reference to FIGS. 10 and 11.

(Configuration of Rotary Electric Machine)

First, the configuration of a rotary electric machine 201 including the rotor core 210 will be described with reference to FIG. 10.

Figure 10:
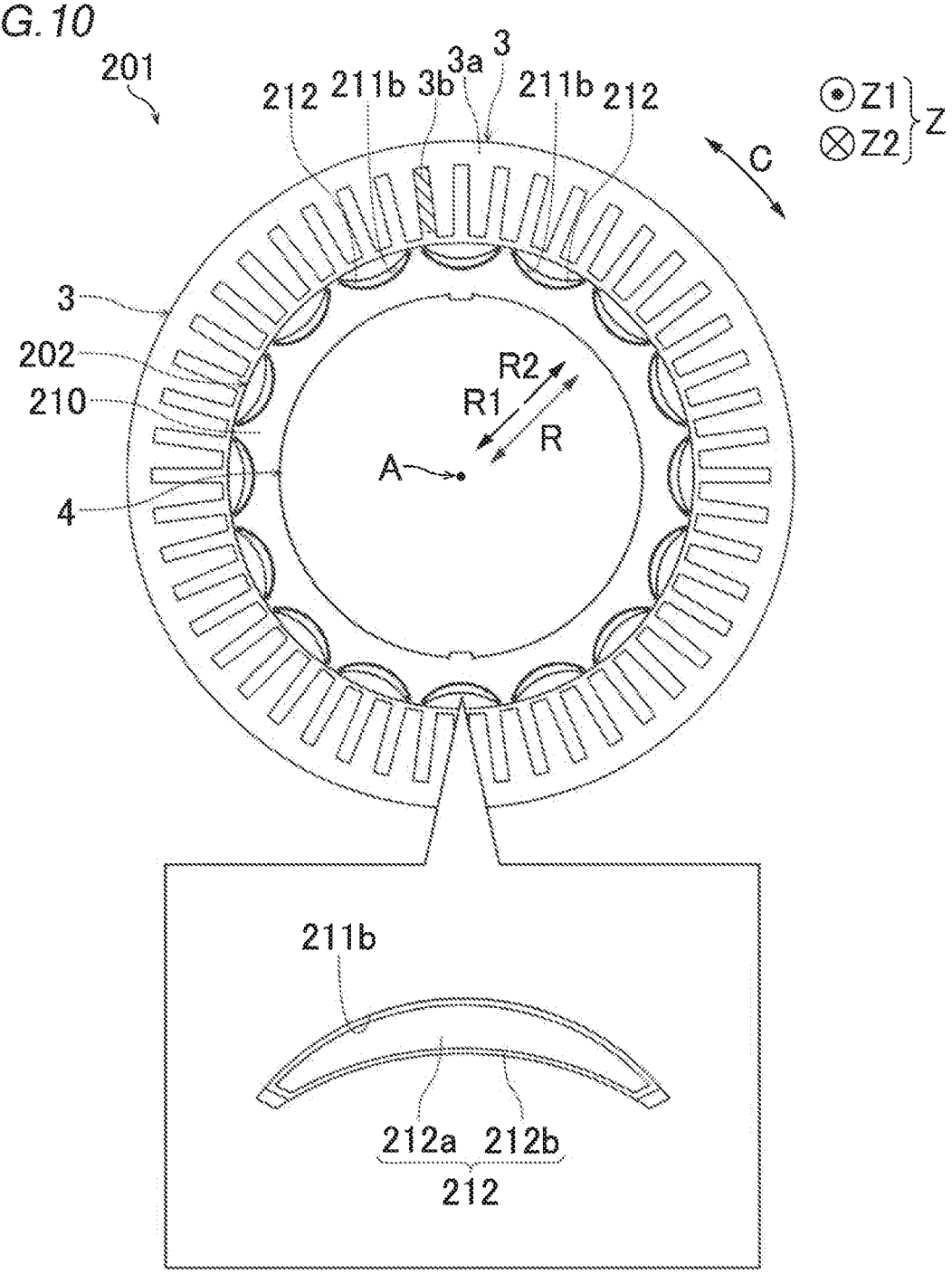
FIG. 10 is a plan view showing the configuration of a rotor core according to a second embodiment.

As shown in FIG. 10, the rotary electric machine 201 includes a rotor 202. The rotor 202 includes the rotor core 210.

(Configuration of Rotor Core)

Next, the configuration of the rotor core 210 will be described with reference to FIGS. 10 and 11.

As shown in FIG. 10, the rotor core 210 has magnet hole portions 211b. The rotor core 210 has a plurality of (16) magnet hole portions 211b. Each of the plurality of magnet hole portions 211b has a crescent shape convex to the R1 side.

The rotor core 210 includes permanent magnets 212. The permanent magnets 212 are housed (disposed) in the magnet hole portions 211b.

In the second embodiment, the permanent magnet 212 includes a compression bonded magnet 212a and an injection bonded magnet 212b. The injection bonded magnet 212b is provided in a gap in the magnet hole portion 211b where the compression bonded magnet 212a is not disposed. That is, the injection bonded magnet 212b is provided so as to adjoin the compression bonded magnet 212a in the magnet hole portion 211b similarly to the first embodiment.

In the second embodiment, the compression bonded magnet 212a is provided on the inner side in the magnet hole portion 211b similarly to the first embodiment. The injection bonded magnet 212b is provided so as to surround the compression bonded magnet 212a in the magnet hole portion 211b similarly to the first embodiment.

In the second embodiment, the compression bonded magnet 212a has a crescent shape when viewed in the axial direction (Z direction) of the rotor core 210. Specifically, one compression bonded magnet 212a having a crescent shape is disposed in each magnet hole portion 211b having a crescent shape. Therefore, similarly to the first embodiment, the compression bonded magnets 212a can be disposed relatively evenly in the circumferential direction compared to a case where the compression bonded magnets 212a have complicated shapes. As a result, it is possible to prevent a decrease in the magnetic balance of the rotor core 210 and a decrease in the performance of the rotary electric machine 201 similarly to the first embodiment.

In the second embodiment, the difference between the volume ratio of the magnetic material to the compression-molding resin material in the compression bonded magnet 212a and the volume ratio of the magnetic material to the injection-molding resin material in the injection bonded magnet 212b is preferably 20% or less similarly to the first embodiment.

Thus, it is possible to prevent an excessive increase in a torque ripple and a cogging torque as shown in simulation results below similarly to the first embodiment. That is, it is possible to prevent torque instability and the decrease in the motor performance similarly to the first embodiment.

<Simulation Results>

Figure 11A:
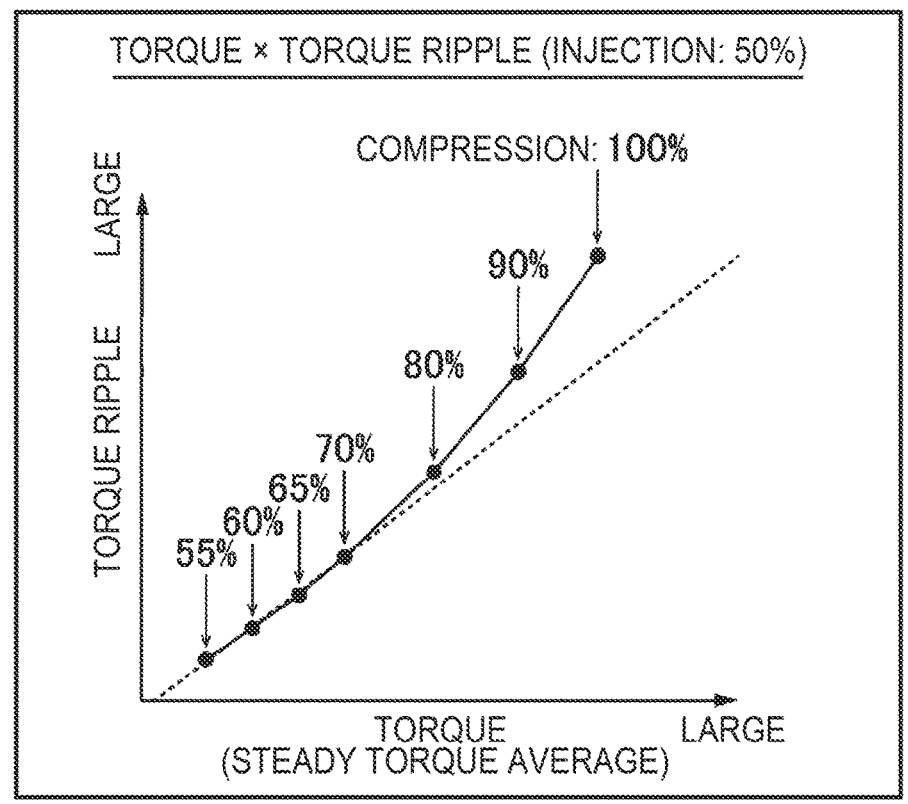
FIG. 11A is a first diagram showing a result of simulation of a torque ripple when the ratio of a magnetic material in a compression bonded magnet of the rotor core is changed according to the second embodiment.
Figure 11B:
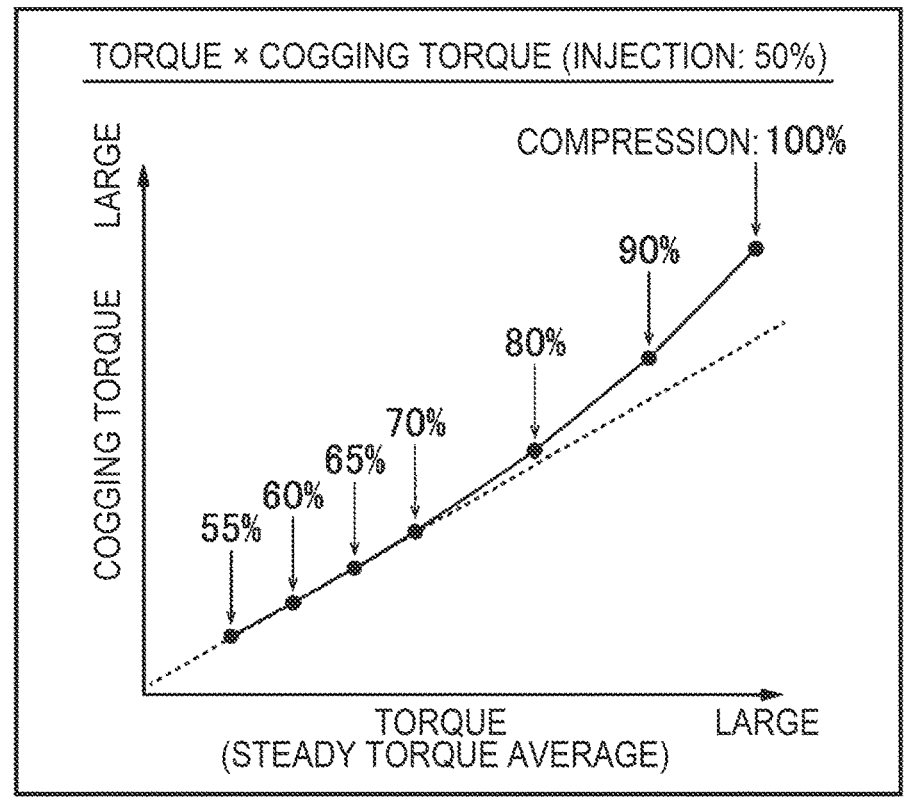
FIG. 11B is a first diagram showing a result of simulation of a cogging torque when the ratio of the magnetic material in the compression bonded magnet of the rotor core is changed according to the second embodiment.

As shown in FIG. 11A, when the ratio of the magnetic material in the injection bonded magnet 212b is 50% and the ratio of the magnetic material in the compression bonded magnet 212a changes, the magnitude of the torque ripple is distributed along a proportional line (dashed line in the figure) approximately in proportion to the magnitude of the torque when the ratio of the magnetic material in the compression bonded magnet 212a is 70% or less. When the ratio of the magnetic material in the compression bonded magnet 212a is more than 70%, the magnitude of the torque ripple is distributed so as to gradually deviate from the proportional line as the ratio of the magnetic material in the compression bonded magnet 212a increases. This means that, when the ratio of the magnetic material in the injection bonded magnet 212b is 50% and the ratio of the magnetic material in the compression bonded magnet 12a is more than 70%, the magnitude of the torque ripple excessively increases relative to the magnitude of the torque. As shown in FIG. 11B, when the ratio of the magnetic material in the injection bonded magnet 212b is 50% and the ratio of the magnetic material in the compression bonded magnet 212a changes, the magnitude of the cogging torque is distributed along a proportional line (dashed line in the figure) approximately in proportion to the magnitude of the torque when the ratio of the magnetic material in the compression bonded magnet 212a is 70% or less. When the ratio of the magnetic material in the compression bonded magnet 212a is more than 70%, the magnitude of the cogging torque is distributed so as to gradually deviate from the proportional line as the ratio of the magnetic material in the compression bonded magnet 212a increases. This means that, when the ratio of the magnetic material in the injection bonded magnet 212b is 50% and the ratio of the magnetic material in the compression bonded magnet 12a is more than 70%, the magnitude of the cogging torque excessively increases relative to the magnitude of the torque. Therefore, when the ratio of the magnetic material in the injection bonded magnet 212b is 50%, the excessive increase in the torque ripple and the cogging torque can be prevented by setting the ratio of the magnetic material in the compression bonded magnet 212a to 70% or less.

Figure 11C:
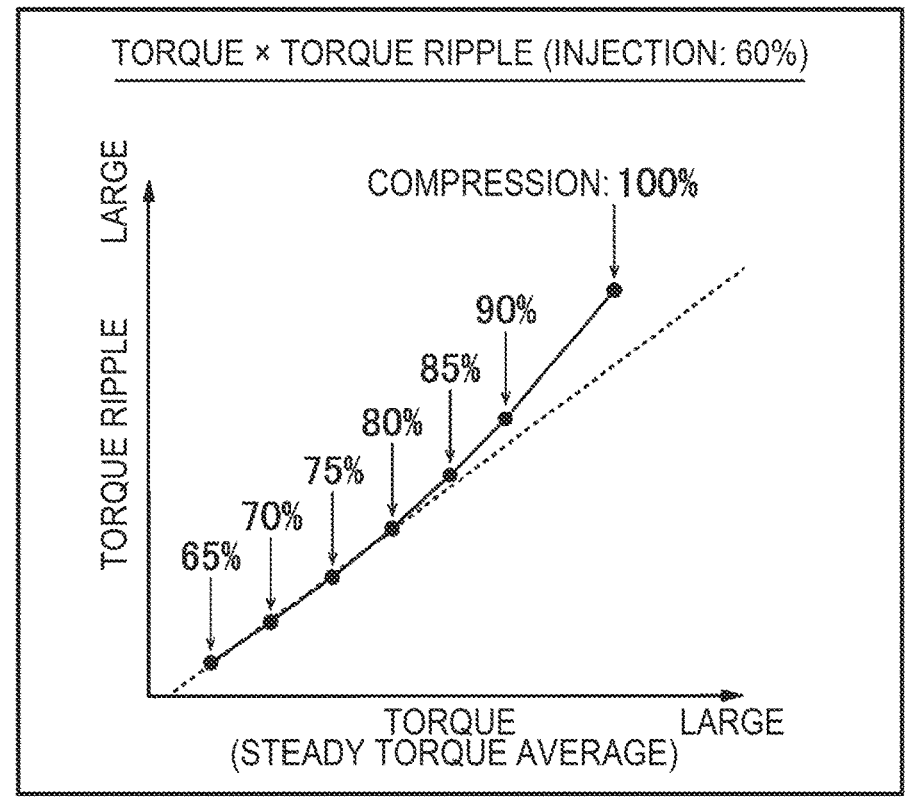
FIG. 11C is a second diagram showing a result of simulation of the torque ripple when the ratio of the magnetic material in the compression bonded magnet of the rotor core is changed according to the second embodiment.
Figure 11D:
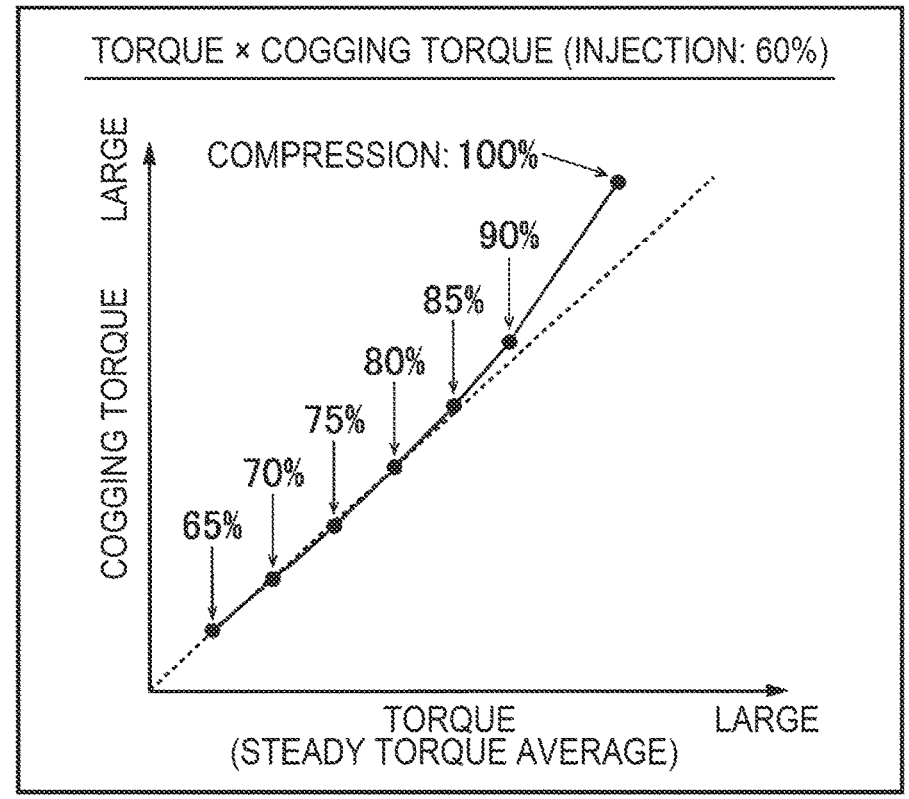
FIG. 11D is a second diagram showing a result of simulation of the cogging torque when the ratio of the magnetic material in the compression bonded magnet of the rotor core is changed according to the second embodiment.

As shown in FIG. 11C, when the ratio of the magnetic material in the injection bonded magnet 212b is 60% and the ratio of the magnetic material in the compression bonded magnet 212a changes, the magnitude of the torque ripple is distributed along a proportional line (dashed line in the figure) approximately in proportion to the magnitude of the torque when the ratio of the magnetic material in the compression bonded magnet 12a is 80% or less. When the ratio of the magnetic material in the compression bonded magnet 212a is more than 80%, the magnitude of the torque ripple is distributed so as to gradually deviate from the proportional line as the ratio of the magnetic material in the compression bonded magnet 212a increases. This means that, when the ratio of the magnetic material in the injection bonded magnet 212b is 60% and the ratio of the magnetic material in the compression bonded magnet 12a is more than 80%, the magnitude of the torque ripple excessively increases relative to the magnitude of the torque. As shown in FIG. 11D, when the ratio of the magnetic material in the injection bonded magnet 212b is 60% and the ratio of the magnetic material in the compression bonded magnet 212a changes, the magnitude of the cogging torque is distributed along a proportional line (dashed line in the figure) approximately in proportion to the magnitude of the torque when the ratio of the magnetic material in the compression bonded magnet 212a is 80% or less. When the ratio of the magnetic material in the compression bonded magnet 212a is more than 80%, the magnitude of the cogging torque is distributed so as to gradually deviate from the proportional line as the ratio of the magnetic material in the compression bonded magnet 212a increases. This means that, when the ratio of the magnetic material in the injection bonded magnet 212b is 60% and the ratio of the magnetic material in the compression bonded magnet 12a is more than 80%, the magnitude of the cogging torque excessively increases relative to the magnitude of the torque. Therefore, when the ratio of the magnetic material in the injection bonded magnet 212b is 60%, the excessive increase in the torque ripple and the cogging torque can be prevented by setting the ratio of the magnetic material in the compression bonded magnet 212a to 80% or less.

Figure 11E:
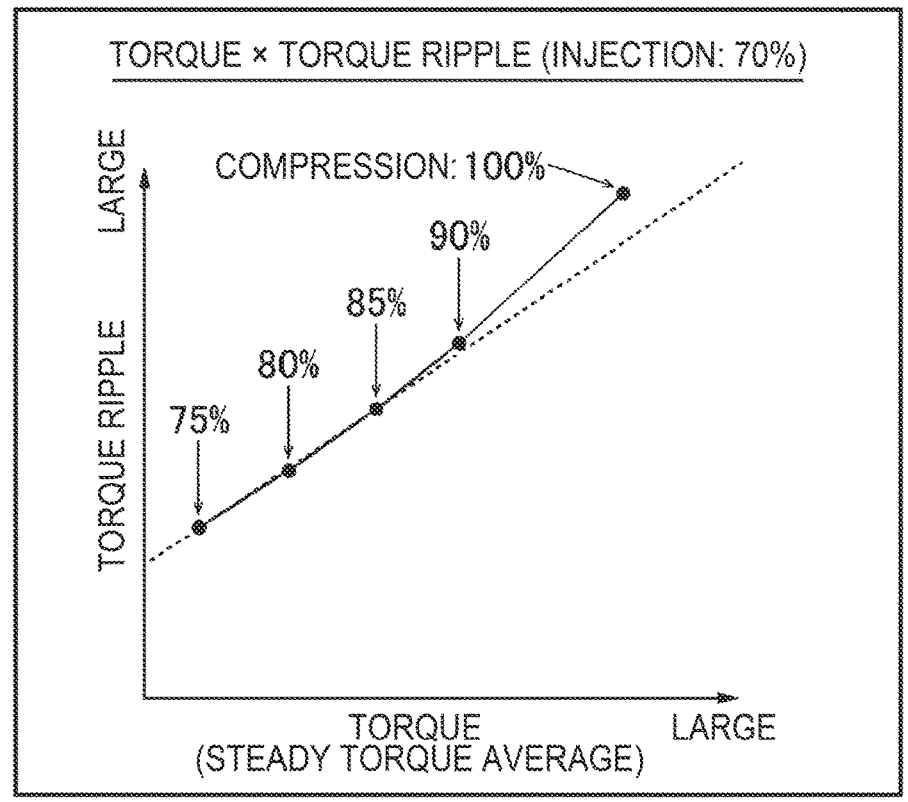
FIG. 11E is a third diagram showing a result of simulation of the torque ripple when the ratio of the magnetic material in the compression bonded magnet of the rotor core is changed according to the second embodiment.
Figure 11F:
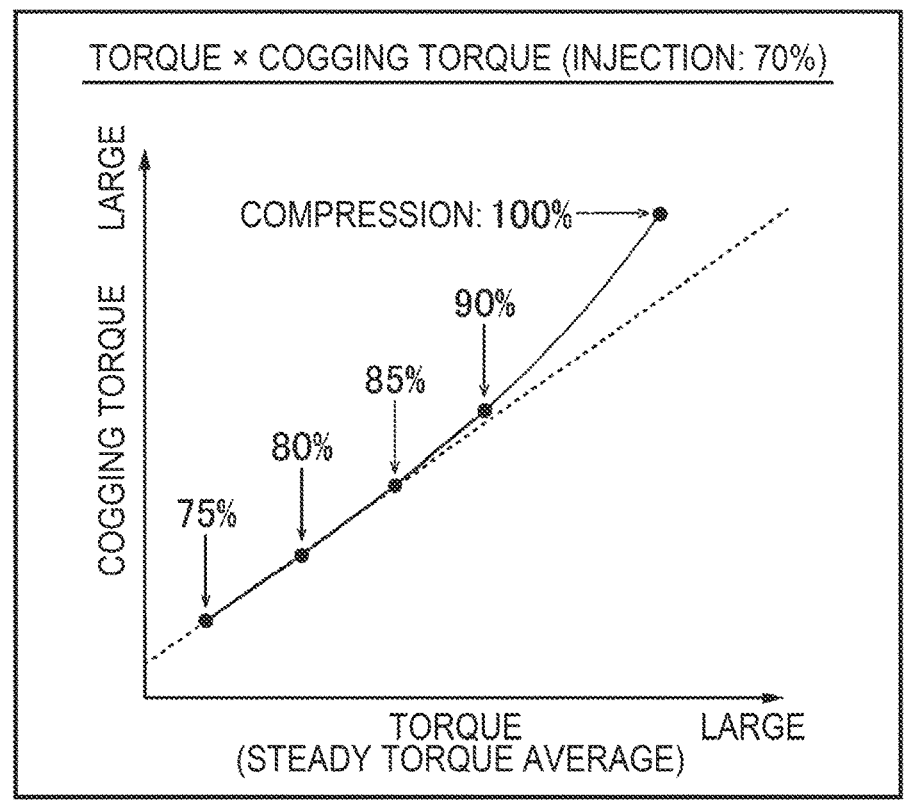
FIG. 11F is a third diagram showing a result of simulation of the cogging torque when the ratio of the magnetic material in the compression bonded magnet of the rotor core is changed according to the second embodiment.

As shown in FIG. 11E, when the ratio of the magnetic material in the injection bonded magnet 212b is 70% and the ratio of the magnetic material in the compression bonded magnet 212a changes, the magnitude of the torque ripple is distributed along a proportional line (dashed line in the figure) approximately in proportion to the magnitude of the torque when the ratio of the magnetic material in the compression bonded magnet 212a is 90% or less. When the ratio of the magnetic material in the compression bonded magnet 212a is more than 90%, the magnitude of the torque ripple is distributed so as to gradually deviate from the proportional line as the ratio of the magnetic material in the compression bonded magnet 212a increases. This means that, when the ratio of the magnetic material in the injection bonded magnet 212b is 70% and the ratio of the magnetic material in the compression bonded magnet 12a is more than 90%, the magnitude of the torque ripple excessively increases relative to the magnitude of the torque. As shown in FIG. 11F, when the ratio of the magnetic material in the injection bonded magnet 212b is 70% and the ratio of the magnetic material in the compression bonded magnet 212a changes, the magnitude of the cogging torque is distributed along a proportional line (dashed line in the figure) approximately in proportion to the magnitude of the torque when the ratio of the magnetic material in the compression bonded magnet 212a is 90% or less. When the ratio of the magnetic material in the compression bonded magnet 212a is more than 90%, the magnitude of the cogging torque is distributed so as to gradually deviate from the proportional line as the ratio of the magnetic material in the compression bonded magnet 212a increases. This means that, when the ratio of the magnetic material in the injection bonded magnet 212b is 70% and the ratio of the magnetic material in the compression bonded magnet 12a is more than 90%, the magnitude of the cogging torque excessively increases relative to the magnitude of the torque. Therefore, when the ratio of the magnetic material in the injection bonded magnet 212b is 70%, the excessive increase in the torque ripple and the cogging torque can be prevented by setting the ratio of the magnetic material in the compression bonded magnet 212a to 90% or less.

The other configurations and effects of the second embodiment are substantially similar to those of the first embodiment.

[Modifications]

The embodiments disclosed herein should be construed as illustrative and not restrictive in all respects. The scope of the present disclosure is defined by the claims rather than by the above description of the embodiments, and includes all changes (modifications) that fall within the meaning and scope equivalent to the claims.

For example, in the first and second embodiments, description has been given of the exemplary configuration in which, in the injection molding step S140, the injection-molding material 61b is cured simultaneously with the compression bonded magnet 12a (212a) that is not cured in the compression molding step S110. However, the present disclosure is not limited to this. In the present disclosure, the compression bonded magnet may be cured in the compression molding step, or may be cured between a timing after the compression molding step and the injection molding step.

In the first and second embodiments, description has been given of the exemplary configuration in which the lower magnet ejector pin 71 and the lower core ejector pin 74 are moved in the vertical direction (Z direction) by the actuators that slide in the vertical direction (Z direction). However, the present disclosure is not limited to this. In the present disclosure, the lower magnet ejector pin and the lower core ejector pin may be moved in the vertical direction by actuators that slide in a direction other than the vertical direction (for example, a horizontal direction).

In the first and second embodiments, description has been given of the exemplary configuration in which the stacked core 11 is disposed such that the axial direction (Z direction) of the rotor core 10 (210) corresponds to the vertical direction. However, the present disclosure is not limited to this. In the present disclosure, the stacked core may be disposed such that the axial direction of the rotor core corresponds to a direction other than the vertical direction.

In the first and second embodiments, description has been given of the example in which the resin injection device 30 is the injection molding machine. However, the present disclosure is not limited to this. In the present disclosure, the resin injection device may be a transfer molding machine.

In the first and second embodiments, description has been given of the example in which the resin injection device 30 includes the plunger portion 116 including the cylinder 116a and the piston 116b. However, the present disclosure is not limited to this. In the present disclosure, the resin injection device need not have the plunger portion including the cylinder and the piston, and the resin injection device may directly inject the bonded magnet from the screw portion into the magnet hole portion. Alternatively, the bonded magnet may be injected from the screw portion into the magnet hole portion via the die portion connected to the screw portion.

In the first and second embodiments, description has been given of the example in which one compression bonded magnet 12a (212a) is disposed in each magnet hole portion 11b (211b). However, the present disclosure is not limited to this. In the present disclosure, two or more compression bonded magnets may be disposed in the magnet hole portion.

In the first and second embodiments, description has been given of the example in which the compression bonded magnet 12a (212a) has the rectangular shape or the crescent shape when viewed in the axial direction (Z direction) of the rotor core 10 (210). However, the present disclosure is not limited to this. In the present disclosure, the compression bonded magnet may have a shape other than the rectangular shape and the crescent shape when viewed in the axial direction of the rotor core.

In the first embodiment, description has been given of the example in which two adjacent magnet hole portions 11b are disposed in the V-shape. In the second embodiment, description has been given of the example in which the magnet hole portion 11b has the crescent shape. In the present disclosure, the shape and disposition of the magnet hole portion are not limited to these shape and disposition.

In the first and second embodiments, description has been given of the example in which the compression bonded magnet 12a (212a) is provided on the inner side in the magnet hole portion 11b (211b) and the injection bonded magnet 12b (212b) is provided so as to surround the compression bonded magnet 12a (212a) in the magnet hole portion 11b (211b). However, the present disclosure is not limited to this. In the present disclosure, the injection bonded magnet may be provided so as not to surround the compression bonded magnet in the magnet hole portion.

DESCRIPTION OF THE REFERENCE NUMERALS 10, 210 . . . rotor core, 11 . . . stacked core, 11b, 211b . . . magnet hole portion, 11c . . . hole end, 12, 212 . . . permanent magnet, 12a, 212a . . . compression bonded magnet, 12b, 212b . . . injection bonded magnet, 12c . . . magnet end, 20 . . . jig, 61a . . . material containing magnetic material and compression-molding resin material, 61b . . . material containing magnetic material and injection-molding resin material

The invention claimed is:

1. A rotor core comprising:
an annular stacked core formed by stacking a plurality of electromagnetic steel sheets and having a magnet hole portion; and
a permanent magnet disposed in the magnet hole portion, wherein
the permanent magnet includes a compression bonded magnet containing a magnetic material and a compression-molding resin material for bonding particles of the magnetic material and provided in the magnet hole portion, and an injection bonded magnet containing the magnetic material and an injection-molding resin material for bonding particles of the magnetic material and provided so as to adjoin the compression bonded magnet in the magnet hole portion.

2. The rotor core according to claim 1, wherein
the compression bonded magnet is provided on an inner side in the magnet hole portion, and
the injection bonded magnet is provided so as to surround the compression bonded magnet in the magnet hole portion.

3. The rotor core according to claim 2, wherein the compression bonded magnet has a rectangular shape or a crescent shape when viewed in an axial direction of the rotor core.

4. The rotor core according to claim 1, wherein a volume ratio of the magnetic material to the compression-molding resin material in the compression bonded magnet is higher than a volume ratio of the magnetic material to the injection-molding resin material in the injection bonded magnet.

5. The rotor core according to claim 4, wherein a difference between the volume ratio of the magnetic material to the compression-molding resin material in the compression bonded magnet and the volume ratio of the magnetic material to the injection- molding resin material in the injection bonded magnet is 20% or less.

6. The rotor core according to claim 5, wherein
the volume ratio of the magnetic material to the compression-molding resin material in the compression bonded magnet is 70% or more and 90% or less, and
the volume ratio of the magnetic material to the injection-molding resin material in the injection bonded magnet is 50% or more and 80% or less.

7. The rotor core according to claim 1, wherein a volume ratio of the compression bonded magnet in the permanent magnet is higher than a volume ratio of the injection bonded magnet in the permanent magnet.

8. A method for manufacturing a rotor core including an annular stacked core formed by stacking a plurality of electromagnetic steel sheets and having a magnet hole portion, and a permanent magnet disposed in the magnet hole portion, the method comprising:
a compression molding step for forming a compression bonded magnet by compression-molding a material containing a magnetic material and a compression-molding resin material for bonding particles of the magnetic material;
a disposing step for disposing the compression bonded magnet in the magnet hole portion of the rotor core after the compression molding step; and
an injection molding step for forming, after the disposing step, an injection bonded magnet by injection molding so that a material containing the magnetic material and an injection-molding resin material for bonding particles of the magnetic material is injected into a gap in the magnet hole portion where the compression bonded magnet is not disposed.

9. The method for manufacturing the rotor core according to claim 8, wherein
the compression molding step is a step of forming the compression bonded magnet by compression-molding a material containing the compression-molding resin material having a thermosetting property, and
the injection molding step is a step of forming the injection bonded magnet by the injection molding so that a material containing the injection-molding resin material having a thermosetting property or the injection-molding resin material having a thermoplastic property is injected into the gap in the magnet hole portion where the compression bonded magnet is not disposed.

10. The method for manufacturing the rotor core according to claim 8, wherein
the disposing step is a step of disposing the compression bonded magnet on an inner side in the magnet hole portion of the rotor core, and
the injection molding step is a step of forming the injection bonded magnet by the injection molding so that the material containing the magnetic material and the injection-molding resin material is injected into the magnet hole portion so as to surround the compression bonded magnet disposed in the magnet hole portion.

* * * * *